US00RE39652E

(19) United States
(12) Reissued Patent
Oashi et al.

(10) Patent Number: US RE39,652 E
(45) Date of Reissued Patent: May 22, 2007

(54) MULTI-MEDIA INFORMATION RECORD DEVICE, AND A MULTI-MEDIA INFORMATION PLAYBACK DEVICE

(75) Inventors: Masahiro Oashi, Hirakata (JP); Yuki Kusumi, Sakai (JP); Masahiro Kawai, Higashi-Osaka (JP); Chihiro Kawahara, Kadoma (JP); Ryoichi Sasaki, Hirakata (JP)

(73) Assignee: Matsushita Electric Industrial Co., Ltd., Osaka (JP)

(21) Appl. No.: 09/587,107

(22) Filed: Jun. 2, 2000

Related U.S. Patent Documents

Reissue of:
(64) Patent No.: 5,767,845
Issued: Jun. 16, 1998
Appl. No.: 08/512,302
Filed: Aug. 8, 1995

(30) Foreign Application Priority Data

Aug. 10, 1994 (JP) ..... 6-188424
Aug. 4, 1995 (JP) ..... 7-199807

(51) Int. Cl.
*G06T 01/00* (2006.01)

(52) U.S. Cl. ..... 715/500.1; 345/475
(58) Field of Classification Search ..... 707/500.1, 707/501.1; 386/46, 52, 55; 345/716–726, 345/473–475; 715/500.1, 501.1, 719–726
See application file for complete search history.

(56) References Cited

U.S. PATENT DOCUMENTS 3,510,210 A * 5/1970 Haney ..... 382/39
4,951,229 A * 8/1990 DiNicola et al. ..... 395/173
5,208,588 A * 5/1993 Nishiyama ..... 345/123

(Continued)

FOREIGN PATENT DOCUMENTS

| | | |
|---|---|---|
| JP | 3-156573 | 7/1991 |
| JP | 3-286482 | 12/1991 |
| JP | 3-289280 | 12/1991 |
| JP | 3-291696 | 12/1991 |
| JP | 4-960 | 1/1992 |
| JP | 528648 | 2/1993 |
| JP | 5-53544 | 3/1993 |
| JP | 5314228 | 11/1993 |
| JP | 670113 | 3/1994 |
| JP | 6-343146 | 12/1994 |
| JP | 6348580 | 12/1994 |

OTHER PUBLICATIONS

MacroModel, MacroMedia, Chapter 4, pp. 147–161, 178–195, May 1993.*

Harada, Komei et al., "Scenario Processor: A Conceptual Scenario Writing Environment", IPSJ SIG Technical Reports, vol. 91, No. 65, pp. 135–140, Jul. 19, 1991.

*Primary Examiner*—Cesar Paula

(57) ABSTRACT

A CD-ROM 201 for recording multi-media information of at least one page stream. Contents of each page stream are successively recorded in the storage areas in the CD-ROM 201. The following three items are shown by the page stream: a partial image list having at least one pair of partial image data which describes partial images of one screen image and display state information including X-Y coordinates, X-Y enlargement rates and a rotational angle showing the display state; control information which describes command to be executed corresponding to an input signal; time line information which describes parameters concerning time sequence processing to be executed corresponding to the control information. The display data creation unit 213 synthesizes partial images shown by the partial image list and creates display data from the partial image data and display state information in the page stream read from the CD-ROM 201, and writes the display data in the display data storage unit 209.

26 Claims, 19 Drawing Sheets

U.S. PATENT DOCUMENTS 5,214,758 A * 5/1993 Ohba et al. ..... 348/426
5,353,063 A * 10/1994 Yagisawa et al. ..... 348/426
5,353,329 A 10/1994 Hayashi
5,353,392 A * 10/1994 Luquet et al. ..... 395/174
5,428,723 A * 6/1995 Ainscow et al. ..... 395/174
5,459,830 A * 10/1995 Ohba et al. ..... 395/173
5,502,570 A * 3/1996 Shikakura et al. ..... 386/95
5,566,290 A * 10/1996 Silverbrook ..... 395/173
5,592,602 A * 1/1997 Edmunds et al. ..... 395/174
5,818,436 A 10/1998 Imai et al. ..... 715/500.1

* cited by examiner

FIG. 8 partial image list

| | |
|---|---|
| partial image ID | 1 |
| X-Y coordinates | 100、100 |
| X-Y enlargement rates | 1、1 |
| rotational angle | 0 |
| partial image data | |
| partial image ID | 2 |
| X-Y coordinates | 120、120 |
| X-Y enlargement rates | 1、1 |
| rotational angle | 0 |
| partial image data | |
| partial image ID | 3 |
| X-Y coordinates | 150、150 |
| X-Y enlargement rates | 1、1 |
| rotational angle | 0 |
| partial image data | |

control information

| | |
|---|---|
| input signal A | X-Y coordinates of partial image 1 should be (170,100) |
| input signal B | Start the time line clock |
| input signal C | Read page stream 2 |

time line information

00:00 00:01 00:02 00:03

X-Y coordinates animation : partial image ID3
150,150 170,170 190,150 time line stream : 1
dynamic picture display object : partial image ID3

FIG. 11 partial image list

| | |
|---|---|
| partial image ID | 1 |
| X-Y coordinates | 100、100 |
| X-Y enlargement rates | 1、1 |
| rotational angle | 0 |
| partial image data | |

control information

| | |
|---|---|
| input signal A | X-Y coordinates of partial image 1 should be (200,200) |

time line information

00:00 00:01 00:02 00:03

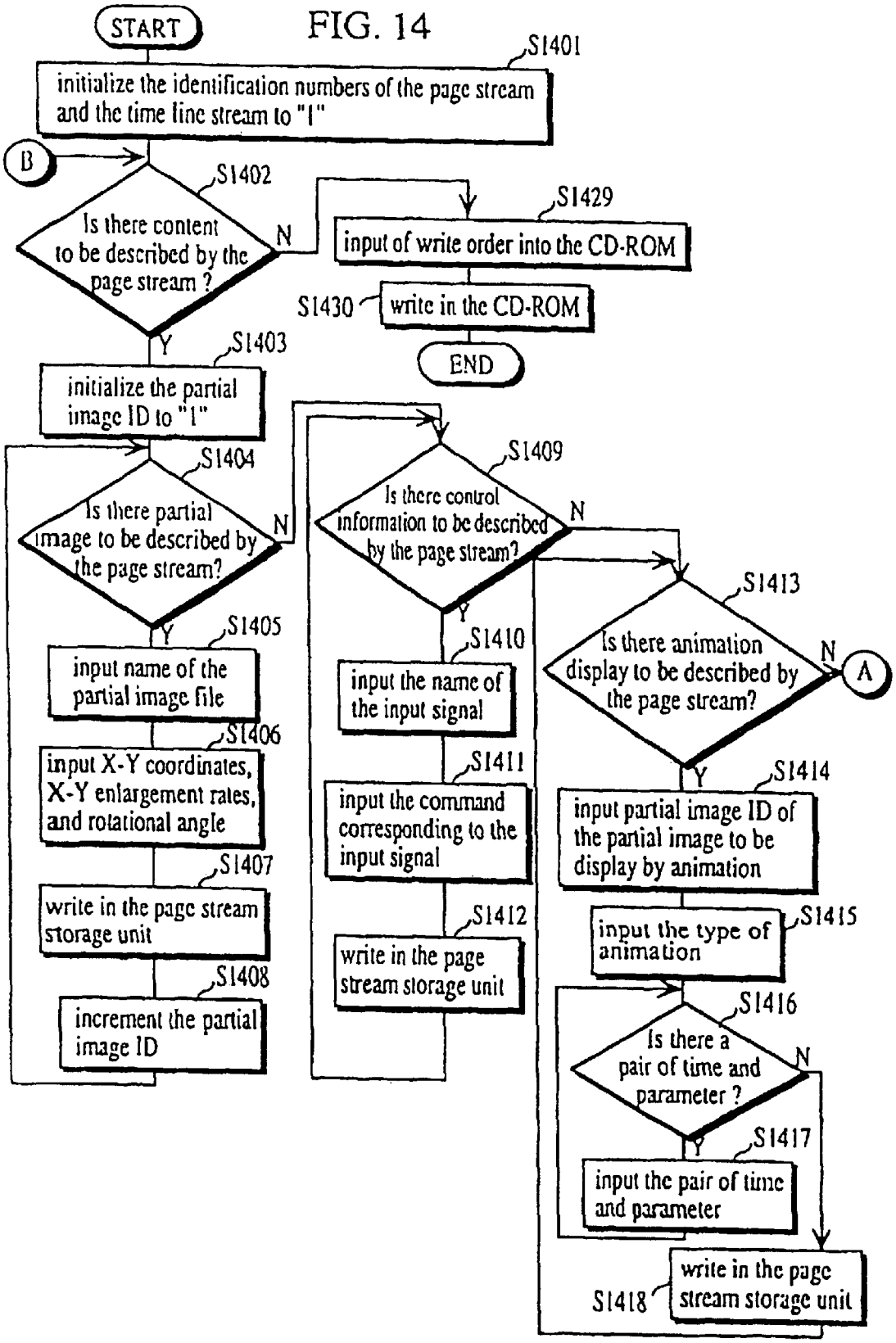
FIG. 14
START
S1401
initialize the identification numbers of the page stream and the time line stream to "1"
B
S1402
Is there content to be described by the page stream ?
N
Y
S1429
input of write order into the CD-ROM
S1430
write in the CD-ROM
END
S1403
initialize the partial image ID to "1"
S1404
Is there partial image to be described by the page stream?
N
Y
S1405
input name of the partial image file
S1406
input X-Y coordinates, X-Y enlargement rates, and rotational angle
S1407
write in the page stream storage unit
S1408
increment the partial image ID
S1409
Is there control information to be described by the page stream?
N
Y
S1410
input the name of the input signal
S1411
input the command corresponding to the input signal
S1412
write in the page stream storage unit
S1413
Is there animation display to be described by the page stream?
N
A
Y
S1414
input partial image ID of the partial image to be display by animation
S1415
input the type of animation
S1416
Is there a pair of time and parameter ?
N
Y
S1417
input the pair of time and parameter
S1418
write in the page stream storage unit

MULTI-MEDIA INFORMATION RECORD DEVICE, AND A MULTI-MEDIA INFORMATION PLAYBACK DEVICE

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to a multi-media information record device and a multi-media information playback device: the multi-media information record device records multi-media information like dynamic/still picture, graphics, sound and the like in a storage device and a recording medium provided to a data server; the multi-media information playback device plays back the multi-media information inputted via a recording medium and a transmission line.

(2) Description of the Related Art

Recently, TV game sets, electronic publications, quality karaoke sets and video on demand devices are used as read-only multi-media information playback devices. These multimedia information playback devices play back multi-media information recorded in a optical disc (CD-ROM) and a digital video disc (DVD), and also multi-media information transmitted from a data server via a network and the like.

The following explanation is about "Denshi Kamishibai-Electronic Picture-Card Show" disclosed in Japanese Laid-open Patent Application No. 5-28648, which is an example of the conventional multi-media information playback device mentioned above. FIG. 1 is an example of a data configuration of multi-media information of a conventional multi-media information playback device, by which images and sound are synchronously played back.

Data and information shown in a data area section and control information section of FIG. 1 are recorded in the recording medium like a digital disc. Control information shown in the control information section is recorded in each block composed of predetermined amount of data shown in the data area section, in which sound data and still picture data mingle. In the data area section of FIG. 1, An (n is a natural number) represents sound data: VnB and VnC represents still pictures A and B, respectively; CLUT (color look up table) represents CLUT data; NOPn represents data to which no operation is applied. In the control information section, (1) represents a data write command; (2) represents a CLUT data command; (3) represents a data display command; (4) represents an audio data command; (5) represents a command of no operation. In the screen image section, A and B represent still pictures A and B, respectively. Both of them are displayed on the screen.

Each command in the control information section is executed in order from the left side to the right side. First, audio data A1, which is digitalized sound information, is transferred to audio data memory by the control information (4), and outputted as an analog audio signal via an audio D/A (digital/analog) converter. Video data V1B is written in a predetermined position of video memory of V42B from V1B, after the write area of a still picture is designated by the control information (1). The CLUT data updates the screen image by the control information (2). Based on a CLUT memory, contents of the video memory are converted to an analog video signal by the video D/A converter, so that the contents are displayed on the screen. While the screen image and an audio signal A44 in FIG. 1 are synchronized, a still picture A can be switched to a still picture B. Although the succeeding still pictures C, D, E . . . are not shown in FIG. 1, the same processing is carried out to play back display screens and sound synchronously.

The next explanation is about a general playback processing of a multi-media information playback device. Multi-media information playback device places a line end signal and a page end signal, which are already inserted in the digitalized image signals, at the end of a scanning line (normally more than 500) and a page (contents of a screen at every 1/30 second) in the display device like Cathode Ray Tube and Liquid Crystal Display, respectively, and displays the scanning lines on the proper pages, so that image signals recorded in the recording medium like a CD-ROM and a DVD are displayed at predetermined positions on the screen of the display device. Multi-media information playback device quadruples a size of an image to be displayed on the screen by using two pixels vertically and horizontally, which forms the smallest square of four pixels, for each pixel in the display device, or by interpolation. This device also reduces an image to a quarter size, by skipping a pixel vertically and horizontally.

Also the multi-media information playback device rotates an image to be displayed on the screen by converting coordinates of each pixel using trigonometric function. As pixels are more dense in the recording medium than in the display device, predetermined adjustment is applied to the recording medium so that a proper image is displayed based on the pixel density of the display device, in time of normal display. So practically, there's no problem when an image which is stored in the CD-ROM as a small still picture is enlarged as much as possible on the screen of the display unit.

Generally, the multi-media information playback device is equipped with necessary programs to play back the multi-media information stored in the recording medium. Sometimes, a different program is already written in the multi-media information so that commands which are added to the multi-media information or which are changed are executed according to the program. In this case, signs which are similar to "[", and "]" are given to the different program which is described by the multi-media information, so that the multimedia information playback device recognizes the program to be executed.

Moreover, the multi-media information playback device displays a still picture, which does not change at all during the display time, in the display device by repeating the steps of reading and displaying the display data stored in a VRAM (video RAM) every 1/30 second or so. On the other hand, dynamic pictures are displayed by repeating the steps of updating the display data stored in the VRAM, reading and displaying the updated display data every 1/30 second or so. Therefore, one storage unit of page data which shows each screen image of the display device is about 1/30 second for dynamic pictures.

Sound which is played back synchronously with the dynamic pictures can be delimited by 1/30 second or so and stored with each page data which consists the dynamic picture. Therefore, the multi-media information playback device is equipped with a storage unit which stores sound data of at least 1/30 second so that the sound is successively played back along with the dynamic pictures.

As for DVD, details can be found in the next reference; "Movies can be stored in a hard disc; photo-electric magnetic and phase change", featured in Jul. 18, 1994 issue of "Nikkei Electronics No. 613", pages 76–81.

However, in the conventional art mentioned above, data about movies, sound, and their controlling, are stored fixedly. Specifically, in the case of image data, data for the whole screen image including the background is stored as one still picture data. Therefore, when part of the screen image is changed by, e.g., moving a part of the still picture to a different position on the screen, enlarging or reducing a part of the still picture, more still picture data coping with the change has to be stored in the CD-ROM or the DVD. So the maximum number of the still pictures which can be displayed is limited by the storage capacity of the CD-ROM and the DVD. Moreover, each time the still picture data is displayed, they have to be read from the CD-ROM and the DVD, so the number of still pictures which can be displayed per unit time is limited by the data transfer rate between the CD-ROM or the DVD and a memory.

When the audio data, the still picture data, the dynamic picture data and the control information are stored in different storage areas, the multi-media information playback device has to access different storage areas of the CD-ROM or the DVD in order to read the control information and each data used for it every time it executes the control information. This results in bad read efficiency. Also, load of the multi-media information playback device for controlling the internal memory is large since data are separately read into the memory provided to the multi-media information playback device from the different storage areas of the CD-ROM and the DVD.

SUMMARY OF THE INVENTION

It is an object of the present invention to provide a multi-media information playback device, in which readout of display data from a recording medium is not necessary each time a part of a screen image is changed and displayed, the display data can be created easily, and the load on a CPU controlling a memory is small.

The above object may be fulfilled by the multi-media information playback device which shows the following features.

(1) A multi-media information playback device which plays back multi-media information recorded in a recording medium comprises a disc having page information successively stored in a storage area, the page information including a partial image list having a pair of partial image information showing a partial image of a screen image and display state information showing display state of the partial image, and the page information also including control information which describes a command to be executed according to an input signal, the control information including a display state change command instructing to change the display state of the partial image; a page information read unit for reading the page information from the disc; a display data creation unit for creating display data of the screen image by placing the partial image shown by the partial image information on a screen; a display unit for displaying each display data created by the display data creation unit; an input unit for receiving an input signal from an operator; and a command execution unit for detecting the input signal inputted by the operator, judging whether the input signal corresponds to the command described by the control information in the page information read by the page information read unit, and instructing the display data creation unit to create new display data by changing the display state of the corresponding partial image according to the display state change command when the input signal corresponds to the display state change command; wherein the display data creation unit creates new display data according to the command execution unit.

According to the above construction, image information and display state of partial images constituting one screen image are shown by the page information successively recorded in the storage area on the disc. So in time of changing and displaying a part of a screen image, what is needed is only creating display data by changing the display state of the corresponding partial image according to the control information. The display data can be changed easily in this way.

Also, a part of the screen image of display data can be changed only by the page information, so that the display data does not have to be read from the recording medium. So there is no need to record display data, whose part of the screen image is changed, in the recording medium beforehand. Therefore, the number of display data which can be displayed per unit time is not limited by the data transfer rate between the disc and the memory.

Moreover, information needed for changing and displaying only a part of the screen image using partial images is shown by the partial image list in one page information. So the load on a CPU which controls memory in the multi-media information playback device is small compared to the case in which necessary information is loaded to the memory of the multi-media information playback device. When a new image screen composed of different partial images in the multi-media information playback device is displayed, new page information which describes the partial images is read, and display data for showing that image screen is created from the page information. Therefore, new display data can be created by only one head seek which happens in time of reading new page information. Compared to the case in which partial image information is read from several places on the disc (which unit head seek happens several times), the readout of the partial image information can be carried out in short time. That means new image screen is displayed in shorter time than before.

(2) The page information may include the partial image list, the control information, and the time sequence control information including a name of a second time sequence information as time sequence information to be played back according to the time sequence processing start command, pairs of IDs of sound information and image information to be played back at predetermined times, and the playback state information which describes at least one of dynamic picture and animation should be displayed in an area relating to the partial image shown by the partial image information; wherein the time sequence information may include the second time sequence information comprising sound information divided into equal predetermined sizes and image information showing an image of at least one of the dynamic picture and the animation, the sound information and the image information being placed in order of playback corresponding to the elapsed time; wherein the time sequence processing execution unit may include a second time sequence processing execution unit for designating sound information and image information in the second time sequence information corresponding to the elapsed time at predetermined times when the second time sequence information is shown by the time sequence processing control information, and instructing the display data creation unit to create new display data by placing the partial image read by the time sequence information read unit in an area shown by the playback state information; wherein the display data creation unit may create new display data according to the second time sequence processing execution unit.

According to above construction, the time sequence information including the second time sequence information, which describes sound information and image information in order of playback corresponding to the elapsed time, is stored successively in the storage area on the disc. So head seek does not happen when the sound information and image information are successively read corresponding to the elapsed time. Therefore, the multi-media information playback device can read the sound information and the image information at high speed, so breaks does not happen in sound, animation and/or dynamic pictures, while the multi-media information is played back.

(3) A multi-media information record device for recording multi-media information in a disc may comprise a partial image storage unit for storing the partial image information of at least one partial image in one partial image file, the partial image information being a part of the screen image; a partial image list input unit for receiving input of a name of at least one partial image file in the partial image storage unit and display state information showing display state of the partial image shown by the partial image information in the partial image file; a page information storage unit for having a plurality of separate small storage areas, each of which is used for storing at least a piece of page information; a partial image list write unit for writing a pair of the partial image information and the display state information in a first small storage area in the page information storage unit along with the IDs of the partial image information and the display state information, after reading partial image information from the partial image file whose name is inputted, the display state information being inputted according to the partial image information; a control information input unit for receiving input of control information which includes a name of input signal and display state change command instructing to change display state of the partial image corresponding to the input signal; a control information write unit for writing the inputted control information in a second small storage area in the page information storage unit; and a page information record unit for successively recording information, which is written as a piece of page information in each small storage area in the page information storage unit, in a storage area on the disc.

According to the above construction, the page information can be stored successively in the storage area on the disc. Effects mentioned above can be obtained from the multi-media information playback device which plays back multi-media information from the disc.

(4) A multi-media information playback device for reading multi-media information from a data server connected via a network and playing back the multi-media information may comprise a page information read unit for reading a piece of page information stored as one file from a data server connected via a network, the page information including a partial image list having at least one pair of the partial image information showing a partial image of a screen image and display state information describing display state of the partial image, and the page information also including control information which describes a command to be executed according to an input signal, the control information including a display state change command instructing to change the display state of the partial image; a display data creation unit for creating display data of the screen image by placing the partial image shown by the partial image information on a screen; a display unit for displaying each display data created by the display data creation unit; an input unit for receiving an input signal from an operator; and a command execution unit for detecting the input signal inputted by the operator, judging whether the input signal corresponds to the command described by the control information in the page information read by the page information read unit, and instructing the display data creation unit to create new display data by changing the display state of the corresponding partial image according to the display state change command when the input signal corresponds to the display state change command; wherein the display data creation unit may create new display data according to the command execution means.

According to the above construction, effects mentioned above can be obtained when multi-media information is read from the data server connected via a network and played back.

(5) A multi-media information record device for recording multi-media information in a data server connected via a network may comprise a partial image storage unit for storing the partial image information of at least one partial image in one partial image file, the partial image information being a part of the screen image; a partial image list input means for receiving input of a name of at least one partial image file in the partial image storage unit and display state information showing display state of the partial image shown by the partial image information in the partial image file; a page information storage unit for having a plurality of separate small storage areas, each of which is used for storing at least a piece of page information; a partial image list write unit for writing a pair of the partial image information and the display state information in a first small storage area in the page information storage unit along with the IDs of the partial image information and the display state information, after reading partial image information from the partial image file whose name is inputted, the display state information being inputted according to the partial image information; a control information input unit for receiving input of control information which includes a name of input signal and display state change command instructing to change display state of the partial image corresponding to the input signal; a control information write unit for writing the inputted control information in a second small storage area in the page information storage unit; and a page information record unit for recording contents of a piece of page information in one file in the data server after transmitting contents written as a piece of page information in each storage area in the page information storage unit to a data server along with its write request.

According to the above construction, each page information can be stored in individual file in the data server, and above effects can be obtained in the multi-media information playback device which reads and plays back multi-media information from the data server.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows contents of the page stream 1, which is a concrete example of the page stream shown in FIG. 5.

FIG. 11 shows contents of a page stream 2, which follows the page stream 1 shown in FIG. 8.

FIG. 14 is a flow chart showing procedure of the recording of the multi-media information in the multi-media information record device 1200 of the present embodiment.

DESCRIPTION OF THE PREFERRED EMBODIMENTS (Embodiment 1)

Figure 1:
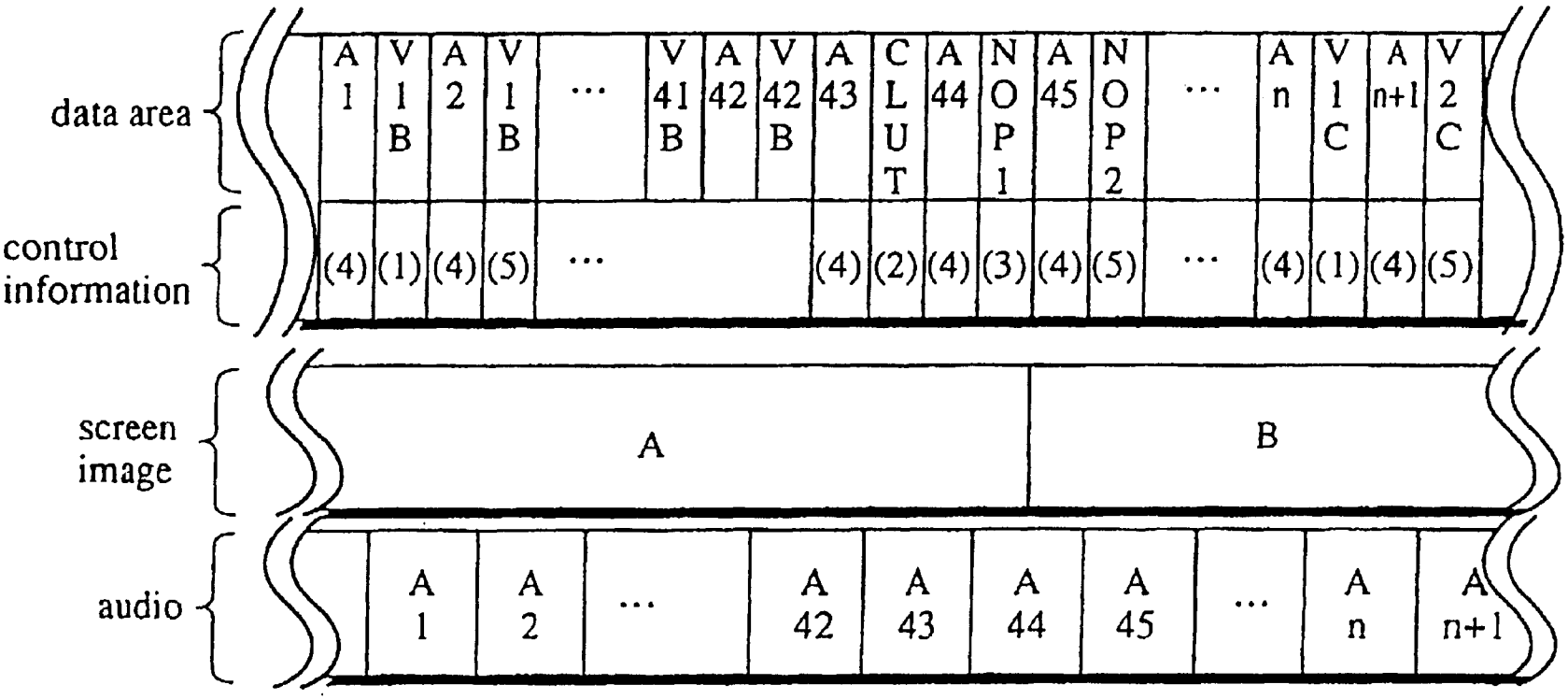
FIG. 1 PRIOR ART
FIG. 1 is an example of data configuration of multi-media information, which is showing synchronous playback of images and sound in the conventional multi-media information playback device.
Figure 2:
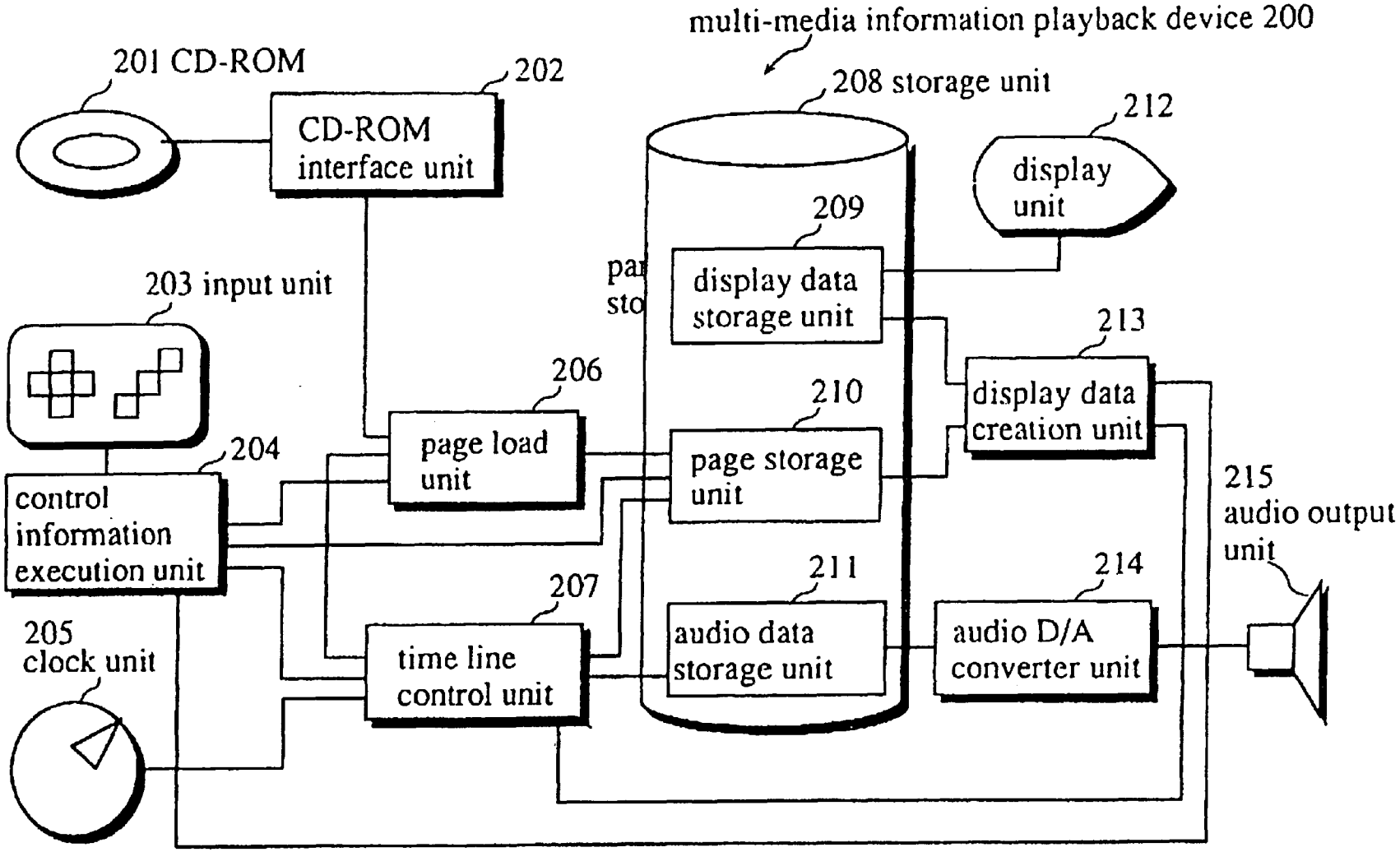
FIG. 2 is a block diagram showing functional construction of a multi-media information playback device 200 of the first embodiment of the present invention.
Figure 3:
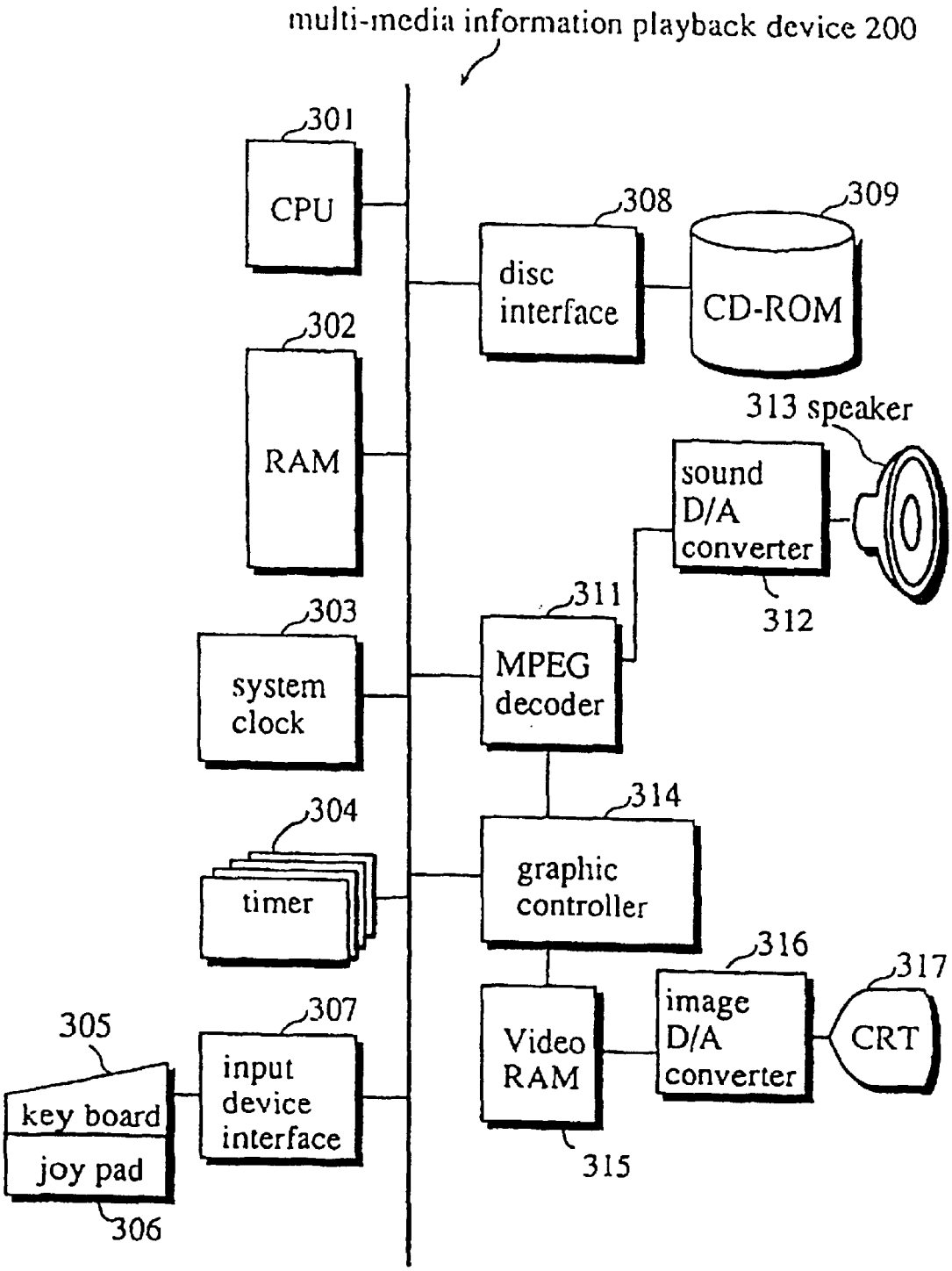
FIG. 3 is a block diagram showing hardware construction of the multi-media information playback device 200 shown in FIG. 2.

FIG. 2 is a block diagram showing functional construction of a multi-media information playback device 200 of Embodiment 1 of the present invention. FIG. 3 is a block diagram showing hardware construction of the multi-media information playback device 200 shown in FIG. 2.

As shown in FIG. 2, the multi-media information playback device 200 comprises a CD-ROM 201, a CD-ROM interface unit 202, an input unit 203, a control information execution unit 204, a clock unit 205, a page load unit 206, a time line control unit 207, a storage unit 208, a display unit 212, a display data creation unit 213, an audio D/A conversion unit 214, and an audio output unit 215. The storage unit 208 further comprises a display data storage unit 209, a page storage unit 210, and an audio data storage unit 211.

As shown in FIG. 3, the multi-media information playback device 200 comprises a CPU 301, a RAM 302, a system clock 303, a timer 304, a key board 305, a joy pad 306, an input device interface 307, a disc interface 308, a CD-ROM 309, a MPEG decoder 311, a sound D/A convertor 312, a speaker 313, a graphic controller 314, a VRAM 315, an image D/A convertor 316, and a CRT 317, as components of hardware. The CPU 301 comprises functions to control operation of each component of the multi-media information playback device 200, in addition to the functions which are explained as follow.

The CD-ROM 201 can be attached/detached to the multi-media information playback device 200. The following multi-media information is written by High Sierra Format of ISO 9690 and the like.

Figure 4:
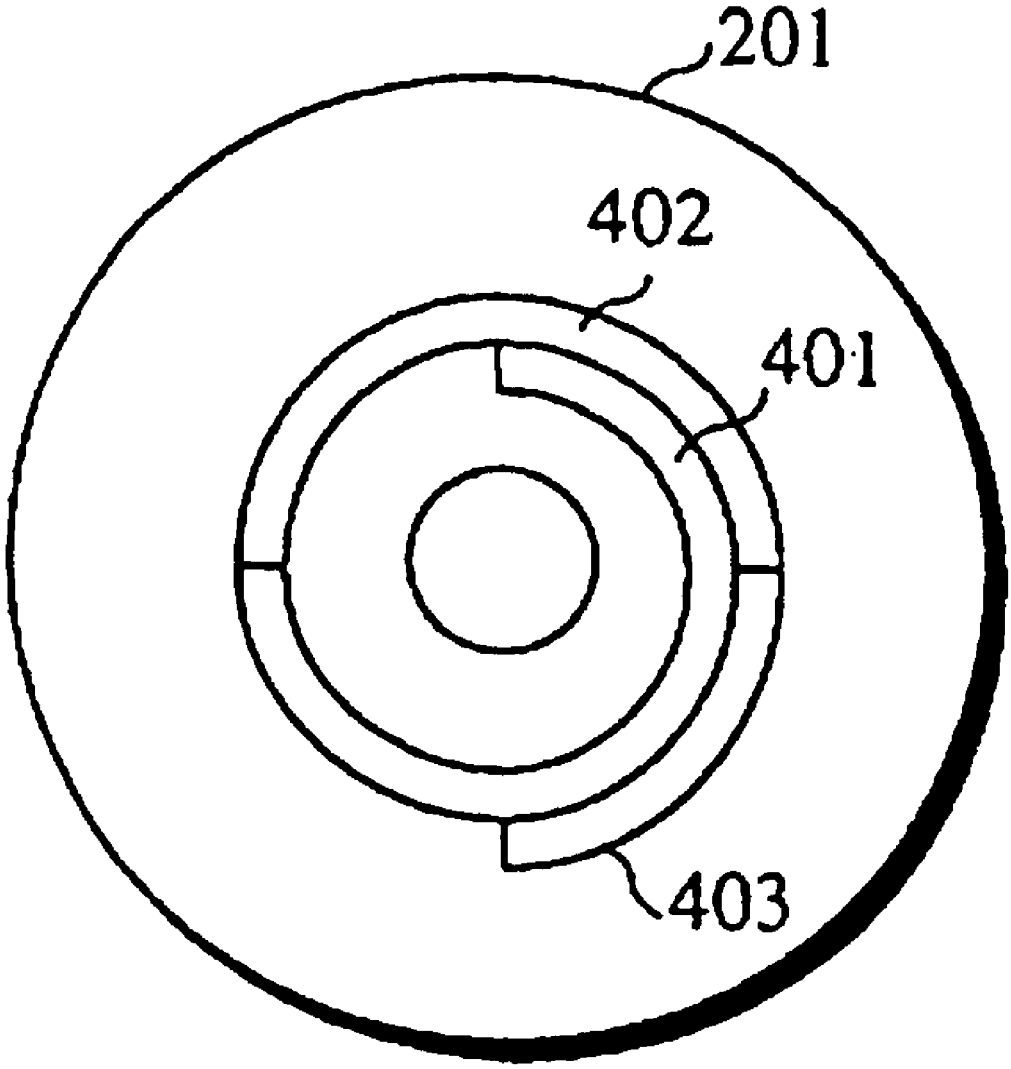
FIG. 4 shows how multi-media information is recorded in the CD-ROM 201, the multi-media information being played back by the multi-media information playback device 200 of the present invention.

FIG. 4 shows how multi-media information, which is played back by the multi-media information playback device 200 of the present embodiment, is stored in the CD-ROM 201. Storage areas 401, 402, and 403 of the CD-ROM 201 continues successively on the track, and data stored in each of the storage areas is read one after another as the CD-ROM 201 turns. A page stream 1, which is mainly composed of partial image data and mentioned later, is recorded in the storage area 401. A page stream 2, which is mainly composed of partial image data and shows the page following the page stream 1, is recorded in the storage area 402. A time line stream 1, which is mainly composed of data about dynamic pictures and animations relating to the page stream 1, is recorded in the storage area 403, and mentioned later. Data is read from the CD-ROM 201 while the page stream 1, the page stream 2, and the time line stream 1 are used as a logical unit, respectively. But they don't necessarily correspond to the physical unit of the CD-ROM 201, like a sector.

A page is an image to be displayed on the screen, which is displayed every 1/30 second or so. Each page stream is multi-media information which describes contents of a plurality of pages. Each of the pages is composed of one or a plurality of predetermined partial images. If the original partial image is the same as the partial image which is mentioned later by the page stream, a partial image can be enlarged/reduced or can be moved parallel/rotationally and one or a plurality of partial images can be deleted by the same page stream.

Figure 5:
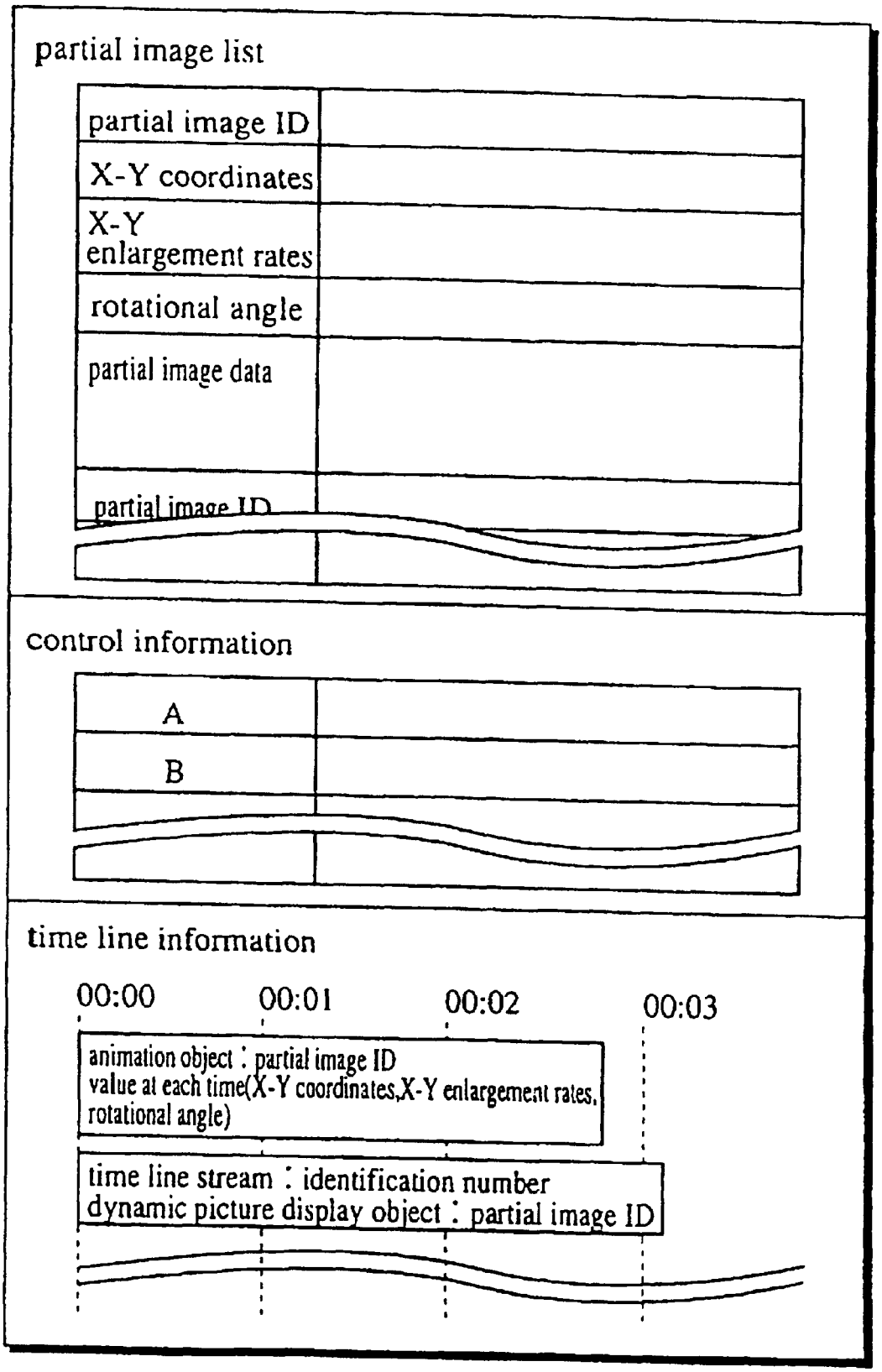
FIG. 5 shows data configuration of a page stream played back by the multi-media information playback device 200 of the present embodiment.

FIG. 5 shows data configuration of a page stream which is played back by the multi-media information playback device 200 of the present embodiment. A page stream consists of a partial image list, control information, and time line information. Each page stream is given an identification number.

In the partial image list, contents of each partial image consisting of one screen image is written: a partial image ID which designates a partial image; X-Y coordinates which show the initial position of the partial image when it is displayed in the page; X-Y enlargement rates which show the scale of enlargement or reduction when the partial image is first displayed in the page; a rotational angle between a partial image shown by the partial image data and the partial image displayed in the page; and partial image data which is expressed by the values corresponding to the pixels of the partial image. The partial image ID is expressed by the number which shows order of placing the partial images in the display data, when display data of one screen image is created by the partial images shown by the page stream. Therefore, when the display areas of the partial image partially overlap with each other, the partial image data corresponding to the pixels of the overlapping areas is updated by partial image data which has a greater partial image ID. So partial images are displayed according to the partial image ID, which means that the partial image having a greater partial image ID covers the proceeding partial images. The partial image data shown by the page stream can be expressed by compressed and decoded bit map data and, if the partial image is geometrical graphic form, it can be expressed by graphic data. Also, the partial image does not necessarily have to be a graphic form. It can be a string showing an input request displayed on each menu screen. In this case, the string can be shown by a character code.

The control information describes commands to be executed by the multi-media information playback device 200 for the input signal from the input unit 203 while the page shown by the page stream is displayed. The commands are described for each input signal. The commands are: change the X-Y coordinates of the partial image; change the X-Y enlargement rates of the partial image; change the rotational angle of the partial image; load other page streams; start the execution of the time line information; overlap a plurality of partial images; display the color images in black and white; emphasize a specific color; change frequency of sound; and the like.

The time line information describes animation display and dynamic picture display: the animation display moves predetermined image pictures shown by the partial image list as time goes by: the dynamic picture display displays the dynamic pictures shown by the time line stream mentioned later. Specifically, as for the animation display, the following items are shown: a partial image ID of the partial image to be displayed in animation (animation object); X-Y coordinates which shows a predetermined display position at every given time after the start of the animation display of the partial image; and an animation display end time of the partial image. As for the dynamic picture display, the following items are shown: the identification number of the time line stream which shows images to be displayed in dynamic picture; and a start time and an end time of the dynamic picture display. Also, when the dynamic picture image is displayed inside the predetermined partial image shown by the partial image list, the partial image ID of the partial image which is displayed in dynamic picture is shown so that the dynamic picture is displayed in place of the predetermined partial image. The dynamic picture image shown by the time line stream mentioned later does not necessarily have to be displayed inside the predetermined partial image shown by the partial image list.

Figure 6:
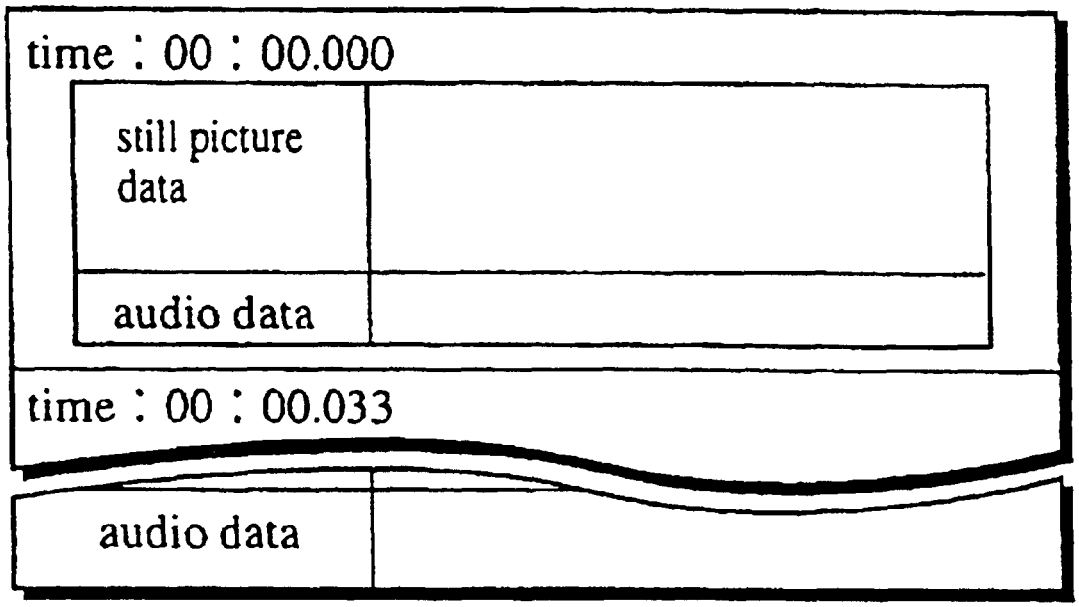
FIG. 6 shows data configuration of time line stream played back by the multi-media information playback device 200 of the present embodiment.

FIG. 6 shows data configuration of the time line stream which is played back by the multi-media information playback device 200 of the present embodiment. Identification numbers are given to each time line stream. As described already, dynamic pictures and animations are displayed by playback of the successive still pictures at every display time, which is every 1/30 second or so. In the time line stream shown in FIG. 6, still picture data expressed by the compressed and encoded bit map data is stored according to the order of the display, along with the audio data corresponding to the still picture. Also the audio data is compressed, encoded, divided into predetermined equal sizes corresponding to the display time of the still picture data, and played back successively while the still picture data corresponding to the audio data is displayed. Each display time can be expressed by the elapsed time after the start of the clock unit 205. When the clock 205 can measure the elapsed time from the start of the display for a plurality of time streams, the display time can be expressed by the elapsed time from the start of the execution of each time line stream.

Also the audio data and the still picture data do not necessarily have to be shown by the time line stream. For example, when the audio data shown by the time line stream is played back while the display picture is displayed by the partial image shown by the page stream, only audio data can be shown in the time line stream. Animations as well as dynamic pictures can be shown by this time line stream. So in order to distinguish these animations from the animations displayed by the partial image shown by the page stream, a term "dynamic picture display" is used for the display of animations and dynamic pictures using the still picture data shown in the time line stream.

The CD-ROM interface unit 202 is implemented by the disc interface 308, and reads multi-media information into the multi-media information playback device 200 according to the instruction of the page load unit 206, the multi-media information being described by the page stream and the time line stream recorded in the CD-ROM 201.

The input unit 203 comprises the joy pad 306, the key board 305, and operation unit like a mouse, which is not illustrated, and receives input of instruction from a user via the input device interface 307. The input unit 203 outputs the input signal corresponding to the received input. For example, this unit 203 outputs the input signals A, B, and C, which correspond to the buttons A, B, and C in the joy pad 306, to the control information execution unit 204.

The control information execution unit 204 is implemented by the CPU 301. This unit 204 interprets and interactively executes control information shown by the page stream loaded to the page storage unit 210. Specifically, the control information execution unit 204 instructs the page load unit 206, the time line control unit 207, and the display data creation unit 213 to execute processing based on the instruction of the control information.

The clock unit 205 is implemented by the system clock 303 and the timer 304. Being activated by the time line control unit 207, the timer 304 measures the elapsed time from the execution start of the time line information with reference to the system clock 303. The clock unit 205 can be equipped with a plurality of the timers 304 so that the elapsed time from the start of the execution of each time line stream can be measured along with the elapsed time from the start of the execution of the time line information.

The page load unit 206 is implemented by the CPU 301. This unit 206 instructs the CD-ROM interface unit 202 to read out a predetermined page stream and loads the page stream to the page storage unit 210, when the multi-media information playback device 200 is activated. This unit also instructs the CD-ROM interface unit 202 to read the designated page stream and the time line stream according to the instruction of the time line control unit 207 or the control information execution unit 204, and loads the page stream or the time line stream to the page storage unit 210.

The time line control unit 207 is implemented by the CPU 301, and starts the execution of the time line information described by the loaded page stream according to the control information execution unit 204. This unit 207 activates the clock unit 205 when the execution of the time line information is started. This unit 207 initializes the timer 304 of the clock unit 205 when the execution of the time line information is completed. In case each time line stream is equipped with the timer 304 which measures the elapsed time from the start of the execution, corresponding timer 304 is initialized when execution of each time line stream is completed.

The time line control unit 207 instructs the display data creation unit 213 to place designated partial images, carrying out the designated processing like enlarging/reducing and rotational migrating, at the designated position of the X-Y coordinates, according to the elapsed time from the start of the execution of the time line information measured by the clock unit 205 when the time line information which instructs animation display is executed.

The time line control unit 207 instructs the page load unit 206 to load the time line stream designated in the time line information to the page storage unit 201, when the time line information which instructs the dynamic picture display is executed. This unit 207 designates the still picture data corresponding to the elapsed time from the start of the execution of the time line information measured by the clock unit 205 and posts the designated still picture data to the display data creation unit 213. Then this unit 207 instructs the display data creation unit 213 to place the still picture data at the predetermined position, for example, inside the partial image designated in the time line information. At the same time, this unit 207 reads the audio data corresponding to the still picture data from the time line stream, and transfers the audio data to the audio data storage unit 211.

The display data storage unit 209 is implemented by the VRAM 315, and stores the display data of one screen page which is created by the display data creation unit 213.

The page storage unit 210 is implemented by the RAM 302, and stores the page stream and the time line stream read from the CD-ROM 201.

The audio data storage unit 211 is implemented by the RAM 302, and stores audio data which is divided into about 1/30 second sizes.

The display unit 212 is implemented by the image D/A converter device 316 and the CRT 317. This unit 212 reads the display data stored in the display data storage unit 209 every 1/30 second or so and displays it in the CRT. The image D/A converter 316 reads the display data from the VRAM 315, which is the display data storage unit 209, every 1/30 second or so, converts the display data to analog signals, and supplies them to the CRT 317. The CRT 317 displays the analog signals which are converted from the display data. In the present embodiment, the CRT 317 is used for the display unit 212, but a liquid crystal display LCD or a television which is connected to the multi-media information playback device 200 can substitute for the CRT 317. The contents of the display unit 212 can be printed on papers.

The display data creation unit 213 is implemented by the CPU 301, the MPEG decoder 311, and the graphic controller 314. This unit 213 creates display data of a whole screen of an initial image, using the partial images shown by the loaded page stream, when a new page steam is loaded to the page storage unit 210. According to the instruction of the control information execution unit 204, this unit 213 carries out the designated processing (e.g. moving X-Y coordinates, enlarging/reducing, rotational moving, etc.) for the partial images shown by the loaded page stream, and creates display data of a whole screen which shows a still image using the partial images. According to the instruction of the time line control unit 207, the unit 213 carries out the designated processing mentioned above for the partial images shown by the loaded page stream, creates display data for animation display, and update the display data for dynamic picture display, using the still picture data designated by the time line control unit 207 from the still picture data shown by the designated time line stream. At this point, the MPEG decoder 311 expands and decodes the image data, which was compressed and encoded according to the MPEG, such as still picture data shown by the time line stream and partial image data shown by the page stream.

The audio D/A converter unit 214 is implemented by the MPEG decoder 311 successively and the sound D/A converter 312. The MPEG decoder 311 reads the audio data stored in the audio data storage unit 211, and expands and decodes the audio data, which is stored compressed and decoded according to the MPEG. The sound D/A converter 312 converts the decoded audio data into analog signals, and outputs them to the speaker 313. As well as the image data, the audio data does not necessarily have to be compressed and decoded according to the MPEG. The audio data can be compressed and decoded according to other formats, or does not have to be compressed and decoded at all. Therefore, the MPEG decoder 311 can be substituted for other decoders. When audio data which is not compressed and decoded is treated, there's no problem without decoders.

The audio output unit 215 is implemented by the speaker 313 and converts analog signals from the audio D/A converter unit 214 to sound and outputs the sound.

Figure 7:
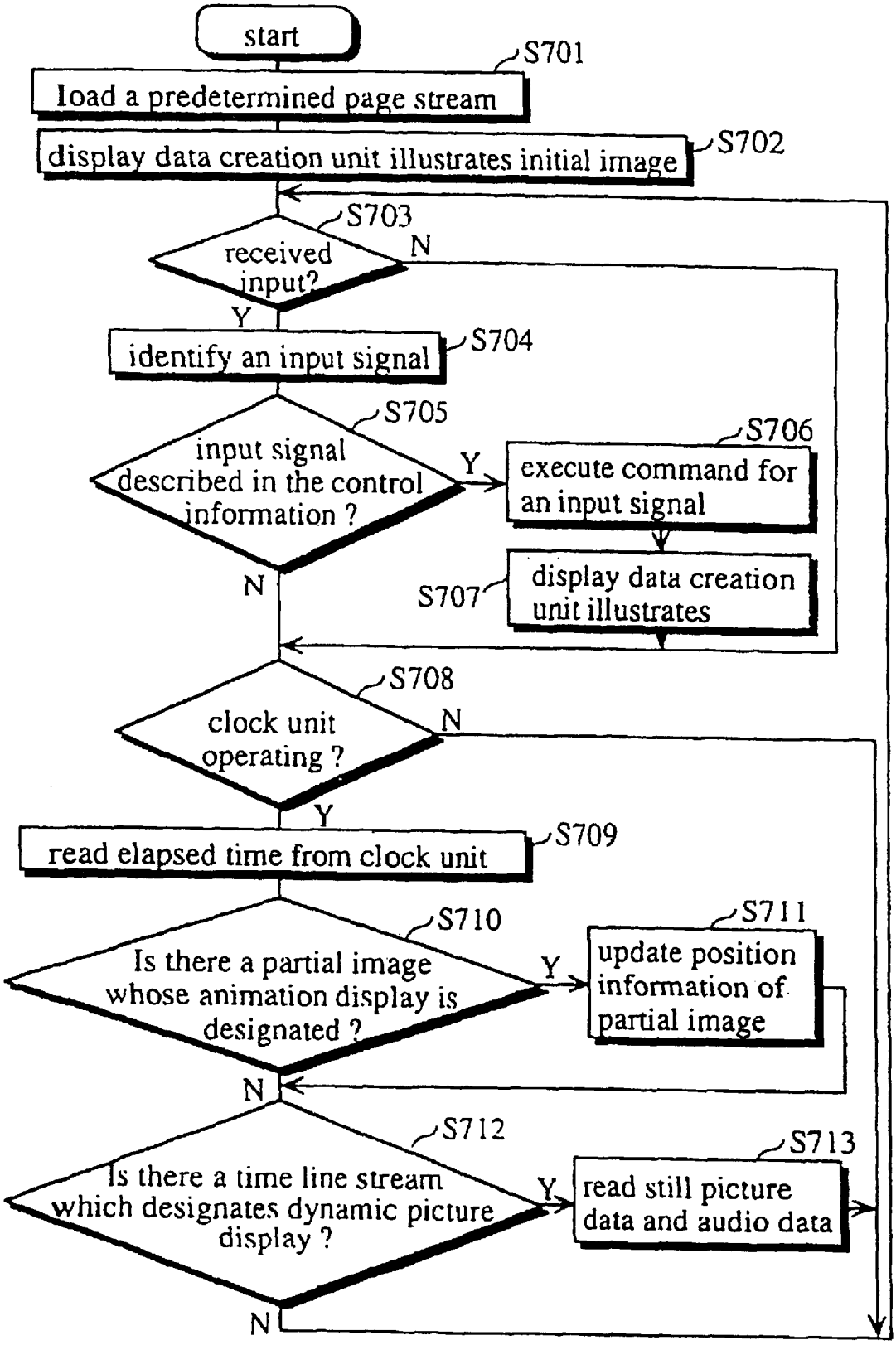
FIG. 7 is a flow chart showing procedure of playback of the multi-media information in the multi-media information playback device 200 of the present embodiment.

Explanation about the procedure of the playback of multi-media information in the multi-media information playback device 200 follows next: it refers to a flow chart in FIG. 7; concrete examples of the page stream 1, the page stream 2 and the time line stream illustrated from FIGS. 8–11; and concrete example of the contents displayed based on them.

FIG. 7 is a flow chart showing the procedure of the playback of multi-media information in the multi-media information playback device 200 of the present embodiment.

The page load unit 206 instructs the CD-ROM interface unit 202 to read a predetermined page stream, like page stream 1 mentioned later, from the CD-ROM 201, and loads the read page stream to the page stream storage unit 210. (Step 701).

The display data creation unit 213 creates display data of the initial image from each partial image shown by the partial image list of the loaded page stream (Step 702). The display data is transferred to the display data storage unit 209, stored there, read and displayed by the display unit 212 every 1/30 second or so.

FIG. 8 shows contents shown by the page stream 1, which is a concrete example of the page stream shown in FIG. 5. In the partial image list, a circle having a pattern of oblique lines inside, a triangle having a pattern of vertical dashed lines inside, and a rectangle having no pattern inside are shown by the bit map data or graphic data as partial image data, according to the order of the partial image IDs. Also the X-Y coordinates which shows the display position of the partial image, the X-Y enlargement rates of the partial image, and a rotational angle are shown. In case of a circle whose partial image ID is 1, bit map data shown by the partial image data is placed based on the X-Y coordinates (100, 100) by the display data creation unit 213, and display data is created with the enlargement rates being (1,1), and the rotational angle being 0. The display data of the triangle and the rectangle whose partial image IDs are 2 and 3, respectively, is created in the same way mentioned above. So in the areas where each partial image overlaps, the partial image data having a small partial image ID is updated by the partial image data having a greater partial image ID.

Figure 9A:
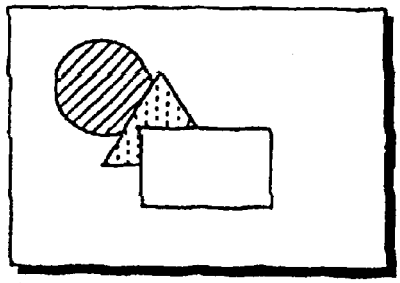
FIG. 9(a) shows contents of the initial image illustrated by a display data creation unit 213 based on the partial image list of the page stream 1 shown in FIG. 8.

FIG. 9(a) shows the contents of the initial image, which is illustrated by the display data creation unit 213, based on the partial image list of the page stream 1 illustrated in FIG. 8. As mentioned already, in the illustration processing of the display data creation unit 213, the partial image data having a smaller partial image ID is updated by the partial image having a greater partial image ID in areas where each partial image overlaps. So, as illustrated in the initial image of the FIG. 9(a), partial images having a greater partial image ID are displayed on top of the layers of other partial images.

The control information execution unit 204 detects an input signal from the input unit 203, when the processing of Step 702 is completed (Step 703), and starts Step 708 when the input signal is not detected.

When the input signal is detected, the control information execution unit 204 identifies the input signal (Step 704), and judges whether the input signal is shown by the control information of the page stream (Step 705). When the input signal is not shown, the control information execution unit 204 starts Step 708.

The control information execution unit 204 executes the command which is described according to the input signal, when the identified input signal is judged to be shown by the control information of the page stream (Step 706). The display data creation unit 213 creates display data based on the execution result of the control information execution unit 204 (Step 707).

The following explanation is about the processing from Steps 705–707 in the multi-media information playback device 200, referring to concrete examples.

The control information execution unit 204 identifies an input signal, and reads the control information from the page stream 1 in FIG. 8, which is loaded to the page storage unit 210. The control information is shown as A, B, and C, so that the control information execution unit 204 can judge the type of the input signal.

Figure 9B:
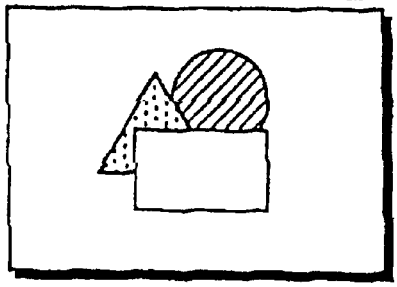
FIG. 9(b) shows contents when an input signal "A" is inputted while the page stream 1 is executed.

The control information execution unit 204 executes a command "The X-Y coordinates of the partial image 1 should be (170, 100)". That is because when the identified input signal is A, it is shown by the control information. Specifically, the control information execution unit 204 passes parameters "partial image ID=1", and "X-Y coordinates (170, 100)" to the display data creation unit 213. The control information execution unit 204 instructs the display data creation unit 213 to create display data based on the parameters. The display data creation unit 213 creates the display data according to the instruction. FIG. 9(b) shows contents when input signal A is inputted while the page stream 1 is executed. The partial image 1 is moved from (100, 100) to (170, 100).

When the identified input signal is B, the control information execution unit 204 executes a command "The clock of the time line should be started.", which corresponds to the input signal B. Specifically, the control information execution unit 204 instructs the time line control unit 207 to start the execution of the time line information shown by the page stream 1. Then the time line control unit 207 activates the clock unit 205. The time line control unit 207 also reads the time line information by the page stream 1, and when there's is a designated time line stream in the time line information which shows the dynamic picture display, the time line control unit 207 instructs the page load unit 206 to load the time line stream. The time line control unit 207 further creates parameters mentioned later based on the time line information, and passes it to the display data creation unit 213, and instructs the display data creation unit 213 to create display data based on the parameters.

As is shown in FIG. 8, time line information about the animation display and the dynamic picture display is shown by the page stream 1.

The following items are shown concerning the animation display: a partial image ID "3" of the partial image to be displayed in animation (animation subject); 00 minute 00.000 second as an animation display start time and 00 minute 03.000 seconds as an animation display end time, both of which are expressed by the elapsed times from the start of the execution of the time line information; X-Y coordinates (150, 150) at 00 minute 00.000 seconds, X-Y coordinates (170, 170) at 00 minute 01.000 seconds, X-Y coordinates (190, 150) at 00 minute 02.000 seconds, all of which show the display positions of the partial image 3 at predetermined elapsed times.

The following items are shown concerning the dynamic picture display: an identification number "1" of the time line stream to be displayed in dynamic pictures; 00 minute 00.000 second as a dynamic picture display start time and 00 minute 03.000 seconds as dynamic picture display end time, both of which are expressed by the elapsed times from the start of the execution of the time line information.

Figure 10:
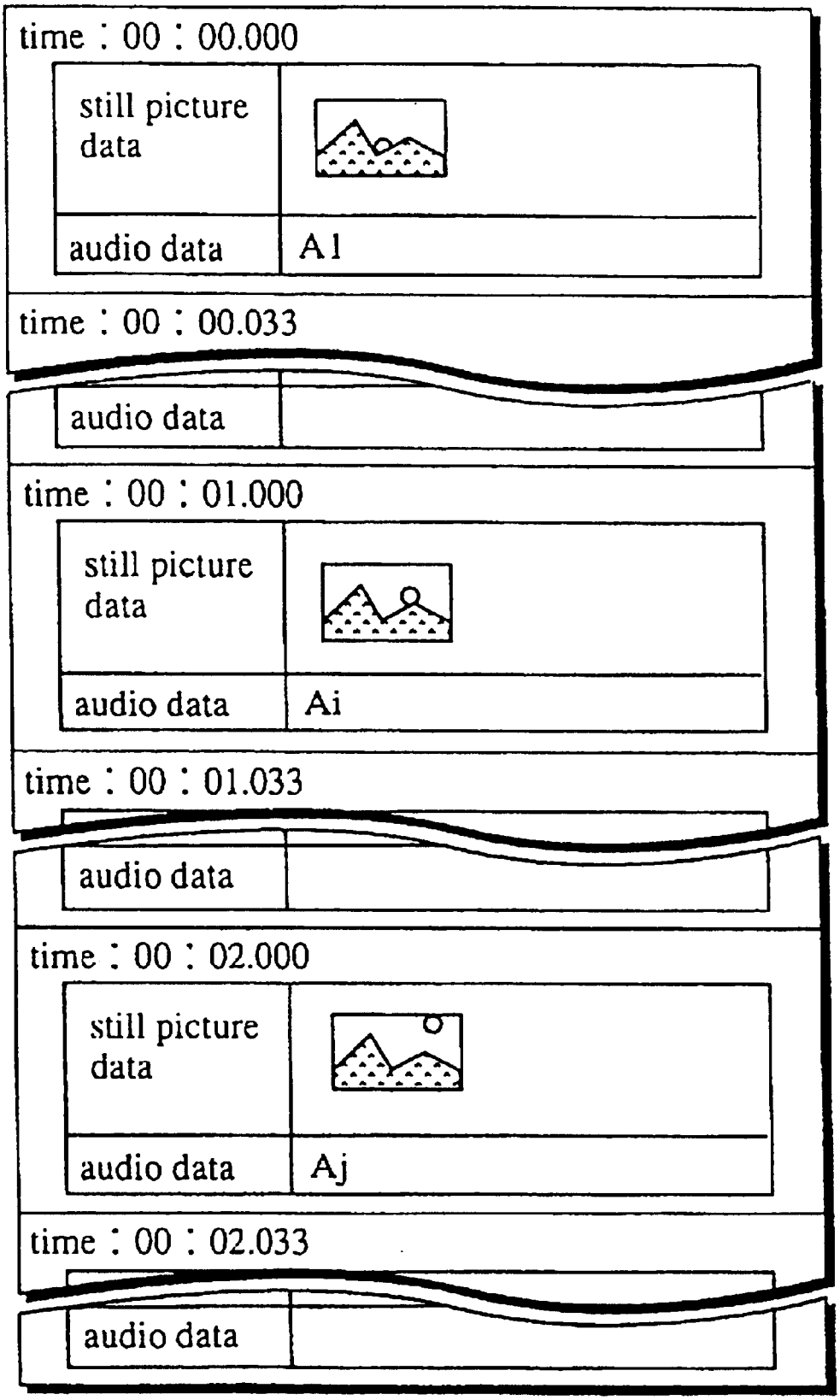
FIG. 10 shows contents of a time line stream 1, which is a concrete example of the time stream shown in FIG. 6.

The time line control 207 instructs the page load unit 206 to load the time line stream 1 to the page storage unit 210. FIG. 10 shows contents of the time line stream 1, which is a concrete example of the time line stream shown in FIG. 6. Still picture data which shows the rising sun and audio data to be played back while the still picture data is displayed are shown by the time line stream, both of which correspond to each elapsed time between 00 minute 00.000 second and 00 minute 03.000 seconds.

When the identified input signal is C, the control information execution unit 204 executes a command "Read the page stream 2", which corresponds to the input signal C. Specifically, the identified input signal instructs the page load unit 206 to load the page stream 2 to the page storage unit 210. Then the page load unit 206 instructs the CD-ROM interface unit 202 to read the page stream 2, and loads the read page stream 2 to the page storage unit 210. The display data creation unit 213 creates display data based on the partial image list of the loaded page stream 2.

FIG. 11 shows contents of the page stream 2, which follows after the page stream 1 shown in FIG. 8. In FIG. 11, a rectangle having a pattern of oblique lines inside is shown by the partial image data as bit map data, along with a partial image data ID "1", X-Y coordinates (100, 100), X-Y enlargement rates (1,1), a rotational angle "0". Also, a command for the input signal A "The X-Y coordinates of the partial image I should be (200, 200)" is described by the control information of the page stream 2. Therefore, when A is inputted while the page stream 2 is executed based on the partial image list mentioned above, the partial image 1 is placed at (200, 200) of the X-Y coordinates. A time line information is not shown by the page stream 2.

FIG. 9 (f) shows contents of the initial image when the page stream 2 is loaded to the page storage unit 210. The rectangle having oblique lines inside, which is shown by the partial image list of the page stream 2, is shown by X-Y enlargement rates (1,1), a rotational angle "0", and X-Y coordinates (100, 100).

The time line control unit 207 checks the clock unit 205 to see whether it is operating, when Step 707 finishes (Step 708). When the clock unit 205 is operating, the time line control unit 207 reads the elapsed time from the start of the execution of the time line information, which is measured by the clock unit 205 (Step 709).

The time line control unit 207 judges whether there is a partial image designated to be displayed in animation, by the elapsed time read from the clock unit 205 (Step 710). When there is such a partial image, the time line control unit 207 calculates X-Y coordinates, which shows the display position of the partial image, from the already designated X-Y coordinates which correspond to a predetermined elapsed time. Then, the time line control unit 207 passes the calculated X-Y coordinates, X-Y enlargement rates, a rotational angle and a partial image ID of the partial image to the display data creation unit 213 as parameters. Then the time line control unit 207 instructs the display data creation unit 213 to create display data based on the parameters. The display data creation unit 213 creates display data based on the parameters, and updates the display data in the display data storage unit 209 (Step 711). When there's no designated partial image in Step 710, the time line control unit 207 starts Step 712.

For example, when the elapsed time in Step 709 is 00 minute 00.000 second, the animation display start time shown by the time line information is 00 minute 00.000 second. So the time line control unit 207 creates a partial image ID "3" and X-Y coordinates (150,150)) at 00 minute 00.000 second as parameters for animation display, and passes them to the display data creation unit 213. Then the display data creation unit 213 moves the partial image 3 to the position designated by the parameter "the X-Y coordinates (150,150) at 00 minute 00.000 second", creates display data, and updates the display data in the display data storage unit 209.

Also, when an elapsed time is 00 minute 01.000 second in Step 709, the partial image 3, which is designated to be displayed in animation, exists. So the time line control unit 207 creates an animation display partial image ID "3", and X-Y coordinates (170,170) at 00 minute 01.000 second as parameters for animation display. Then this unit 207 passes them to the display data creation unit 213. The display data creation unit 213 moves the partial image 3 to (170, 170) based on the parameters and creates display data, and updates the display data in the display data storage unit 209.

When the elapsed time is 00 minute 00.500 second, the time line control unit 207 calculates "X-Y coordinates (160,160) at 00 minute 00.500 second" which is interpolating between the X-Y coordinates (150,150) at 00 minute 01.000 second and X-Y coordinates (170, 170) at 00 minute 01.000 second, and passes it to the display data creation unit 213. The display data creation unit 213 moves the partial image to the (160, 160), creates display data and updates the display data in the display data storage unit 209.

Moreover, the time line control unit 207 judges whether there is a time line stream designating dynamic picture display, by the elapsed time read from the clock 205 (Step 712). When the designated time line stream exits, the time line control unit 207 designates the still picture data corresponding to the elapsed time read from the clock unit 205, and posts the data to the display data creation unit 213. Also the time line control unit 207 reads audio data corresponding to the still picture data from the time line stream and transfers that data to the audio data storage unit 211. The display data creation unit 213 reads the designated still picture data from the designated time line stream and creates display data. After the time line control unit 207 updates the display data in the display data storage unit 209 (Step 713), this unit starts Step 703. If the designated time line stream does not exist in Step 712, the time line control unit 207 starts Step 703.

For example, when the elapsed time in Step 709 is 00 minute 00.000 second, the dynamic picture display start time shown by the time line information is 00 minute 00.000 second. So the time line control unit 207 creates identification number "1" of the time line stream. 00 minute 00.000 second of the still picture data, and the partial image ID "3" as parameter for the dynamic picture display corresponding to the elapsed time 00 minute 00.000 second from the start of the execution of the time line information, and passes them to the display data creation unit 213. At the same time, the time line control unit 207 reads audio data A1 from the time line stream 1, and transfers it to the audio data storage unit 211. The time line control unit 207 instructs the display data creation unit 213 to create display data based on the parameter. Then the display data creation unit 213 places the still picture data designated by the parameter "still picture data=00 minute 00.000 second" inside partial image 3, creates display data, and updates the display data in the display data storage unit 209.

Figure 9C:
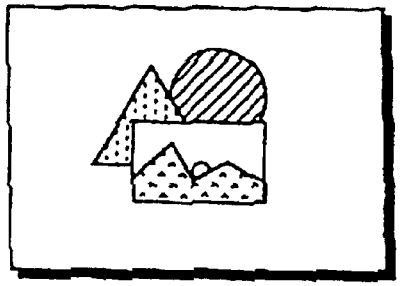
FIG. 9(c) shows contents right after an input signal "B" in inputted while the image shown in FIG. 9(b) is displayed.

FIG. 9(c) shows contents right after the input signal B is inserted while FIG. 9(b) is displayed. FIG. 9(c) shows a screen image created based on each parameter whose elapsed time measured by the clock unit 205 is 00 minute 00.000 second. The partial image 3 to be displayed in animation is displayed by "X-Y coordinates (150, 150) at 00 minute 00.000 second", while the partial images 1 and 2 are displayed on the same position as FIG. 9(b), since their X-Y coordinates are not designated by parameters for animation display. Also, still picture data of "still picture data=00 minute 00.000 second" in the time line stream 1 is displayed inside the partial image 3. At the same time, the audio data A1 is played back. The difference between the contents of the initial image shown in FIG. 9(a) and that of FIG. 9(c) is the position of the circle having a pattern of oblique lines. In the former case, the circle is shown by the X-Y coordinates (100, 100); in the latter case, it is displayed by (170, 100).

Moreover, when the elapsed time in Step 709 is 00 minute 01.000 second, the time line stream 1 designating dynamic picture display, exists. So the time line control unit 207 creates parameters "identification number of the time line stream=1", "still picture data=00 minute 01.000 second", and "partial image ID=3" corresponding to the elapsed time "00 minute 01.000 second" for dynamic picture display, and passes them to the display data creation unit 213. At the same time, the time line control unit 207 reads the audio data Ai corresponding to the elapsed time 00 minute 01.000 second, from the time line stream 1, and transfers the data to the audio data storage unit 211. The display data creation unit 213 places the still picture data of the "00 minute 01.000 second", which is read from the time line stream 1, inside the partial image 3 according to the parameter, and creates display data.

Figure 9D:
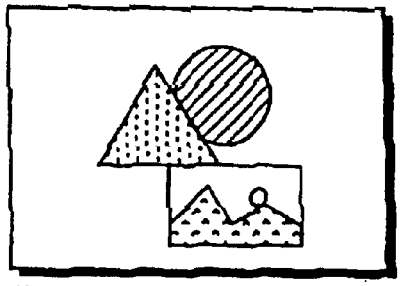
FIG. 9(d) shows contents at "00 minute 01.000 second", which is an elapsed time after the start of the execution of the time line information.
Figure 9E:
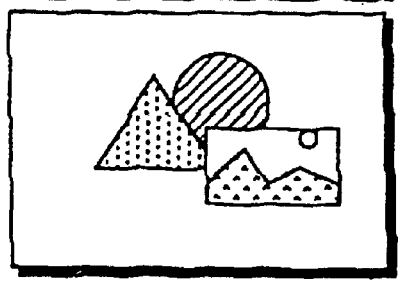
FIG. 9(e) shows contents at "00 minute 02.000 seconds", which is an elapsed time after the start of the execution of the time line information.
Figure 9F:
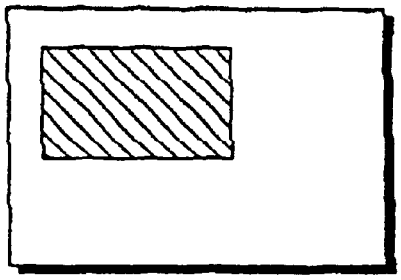
FIG. 9(f) shows contents of the initial image when the page stream 2 is loaded to the page storage unit 210.

FIG. 9(d) shows contents at 00 minute 01.000 second, which is the elapsed time from the start of the execution of the time line information. As shown in FIG. 9(d), the partial images 1 and 2 are displayed at the same positions as FIG. 9(b), but the partial image 3 is moved to the position of the X=Y coordinates (170, 170), and the still picture data of "00 minute 01.000 second" is displayed inside the partial image 3. While this image is displayed, the audio data Ai is played back.

Moreover, FIG. 9 shows contents at the elapsed time, 00 minute 02.000 seconds. The partial images 1 and 2 are displayed at the same positions as they are displayed in FIG. 9(e), by the same processing mentioned above. The partial image 3 is move to (190, 150), and a still picture data of "00 minute 02.000 seconds" are displayed inside it. While this still picture is displayed, the audio data Aj is played back. X-Y coordinates for animation display for the partial image 3 after "00 minute 02.000 seconds" is not shown by the control information in the page stream 1. While animation display continues until "00 minute 03.000 seconds", the partial image 3 is displayed at the X-Y coordinates (190, 150). However, still picture data until "00 minute 03.000 seconds" are successively displayed inside the partial image 3, and the audio data is also played back at the same time.

As explained above, display of partial images can be changed easily according to the present embodiment, compared to the case in which contents of one screen is stored as one image data in the recording medium. Also, even though the contents are limited to the combinations of the partial images, maximum number of the still pictures to be displayed can be increased regardless of the storage capacity of the recording medium. In case of changing the display of the partial image shown by in the loaded page stream, as the image data does not have to be read from the recording medium, the multi-media information playback device 200 can display many still pictures per unit time, regardless of the transfer rate. The contents of each page stream and each time line stream is successively stored on the same track of the CD-ROM, so head seek does not happen when the information is successively read. Speed of data readout from the same page stream and the same time line stream is fast and breaks in the sound and dynamic pictures do not happen, so that the multi-media information is played back accurately. As the partial image list, the control information relating to the partial image, and the time line information are described by one page stream, the image data, control information, and dynamic information are loaded to the RAM 302 and the load of the CPU is decreased, unlike the case in which the information are recorded in the different storage areas in the recording medium.

In the present embodiment, the still picture data and the audio data shown by the time line stream are compressed and encoded according the MPEG, and they are expanded and decoded by the MPEG decoder 311. But the still picture data, the audio data and the partial image data are not necessarily have to be compressed and encoded according to the MPEG. They can be compressed and encoded by other formats like VFW (Video for Windows) or QT (Quick Time). Therefore the MPEG decoder 311 can be substituted for decoders following other formats, or a decoder is not necessary at all in case only the data which is not compressed and encoded is dealt with.

In the present embodiment, the page load unit 206 loads the contents of the designated time line stream from the CD-ROM 201 to the page storage unit 210 at a time, when the execution of the time line information is started; the display data creation unit 213 reads the designated still picture data in the loaded time line stream and creates display data. However, the contents of the time line stream does not necessarily have to be loaded at a time. For example, the page load unit 206 can load the designated still picture data and audio data in the designated timed line stream to the page storage unit 210 at each display time of the dynamic picture display, and the display data creation unit 213 can read the loaded still picture data from the page storage unit 210 and create display data, and the time line control unit 207 can transfer the loaded audio data to the audio data storage unit 211. Generally, the amount of the compressed and encoded image data is large, so the data amount shown by one time line stream can be considered rather large. Therefore, considering the storage capacity of the RAM 302, which is necessary as the page storage unit 210, the page load unit 206 had better load the designated still picture data and audio data to the page storage unit 210 at each display time of the dynamic picture display. As the contents of the time line stream is successively stored on the same track, seek of a read head does not happen, even if the designated still picture data and audio data are loaded from the CD-ROM 201 at each display time. This enables displaying of dynamic pictures without breaks in sound and images.

In the present embodiment, the time line control unit 207 instructs the page load unit 206 to load the time line stream designated in the time line information in time of dynamic picture display; the page load unit 206 instructs the CD-ROM interface stream unit 202 to read the time line stream from the CD-ROM 201. But the time line stream does not necessarily have to be read in this way, and the time line control unit 207 can directly instruct the CD-ROM interface unit 202 to read the designated time line stream.

In the present invention, the display unit 212 displays each page every 1/30 second or so. But in order to display dynamic picture images of high quality, each page has to be displayed every 1/60 or 1/150 second or so. In this case, still picture data and audio data corresponding to the display time of every 1/60 second or 1/150 second from the start of the execution of the time line stream are shown.

In FIG. 4, the page stream and the time line stream correlating with each other, are stored successively in the storage areas on the track of the CD-ROM 201. The most important point is that contents of each page stream or each time line stream is stored successively on the same track; the contents of the page stream and the time line stream do not have to be correlating with each other. For example, only one of the page stream and the time line stream can be stored successively in the storage areas.

In the present embodiment, the CD-ROM 201 is explained as the recording medium, but other storage medium like DVD can substitute for the CD-ROM 201. Broader interpretation is possible: the recording medium can be a transmission line like a communication line, or a storage device of a video server mentioned later. In the storage area, all information does not have to be stored in the form of digital data. Part of the data, e.g. audio data of the time line stream, can be analog data and can be stored divided. In this cased, the multi-media information playback device 200 can be equipped with a storage unit of analog data instead of the audio data storage unit 211.

(Embodiment 2)

Figure 12:
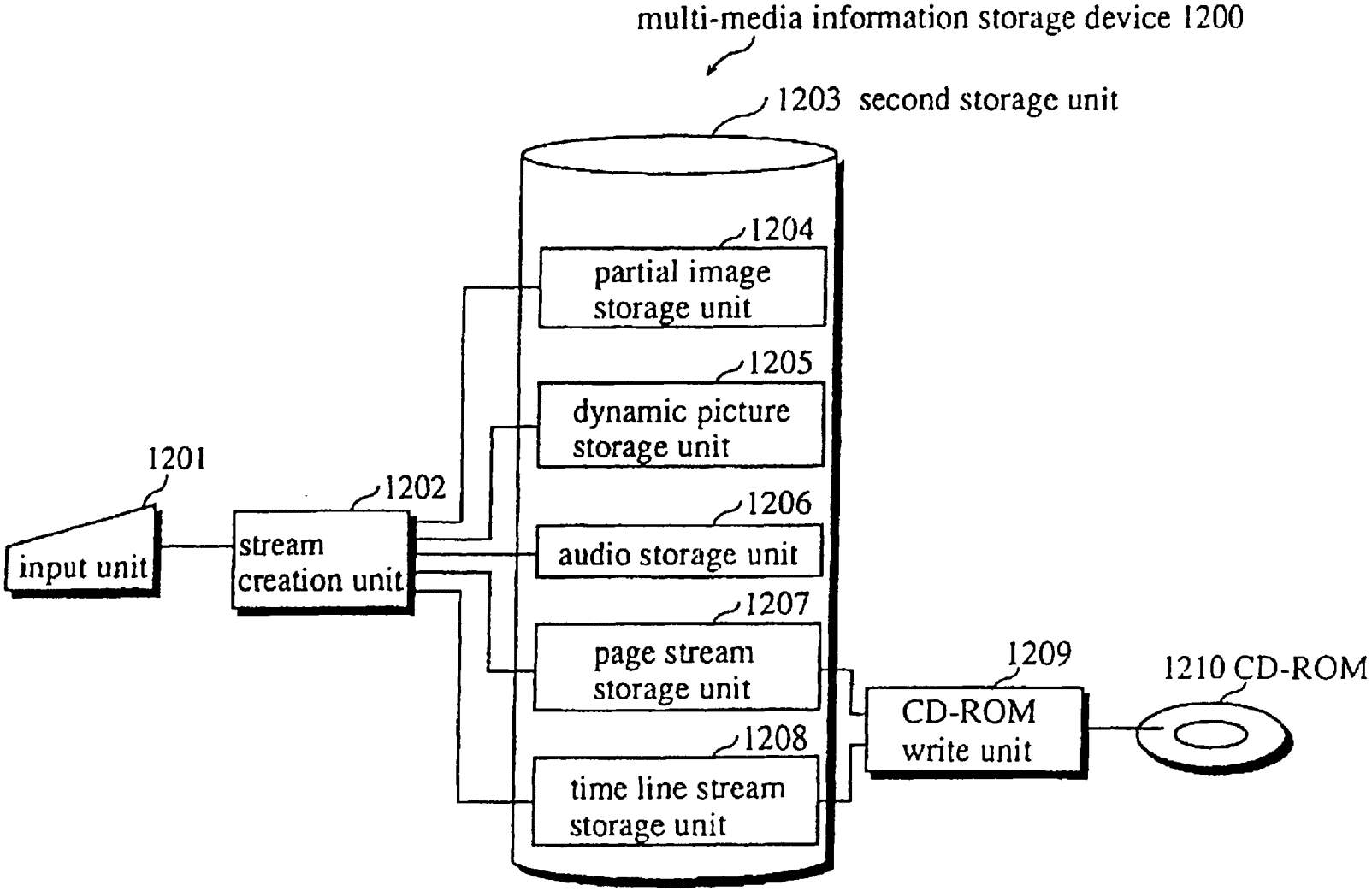
FIG. 12 is a block diagram showing construction of the multi-media information record device 1200 of the second embodiment of the present invention.
Figure 13:
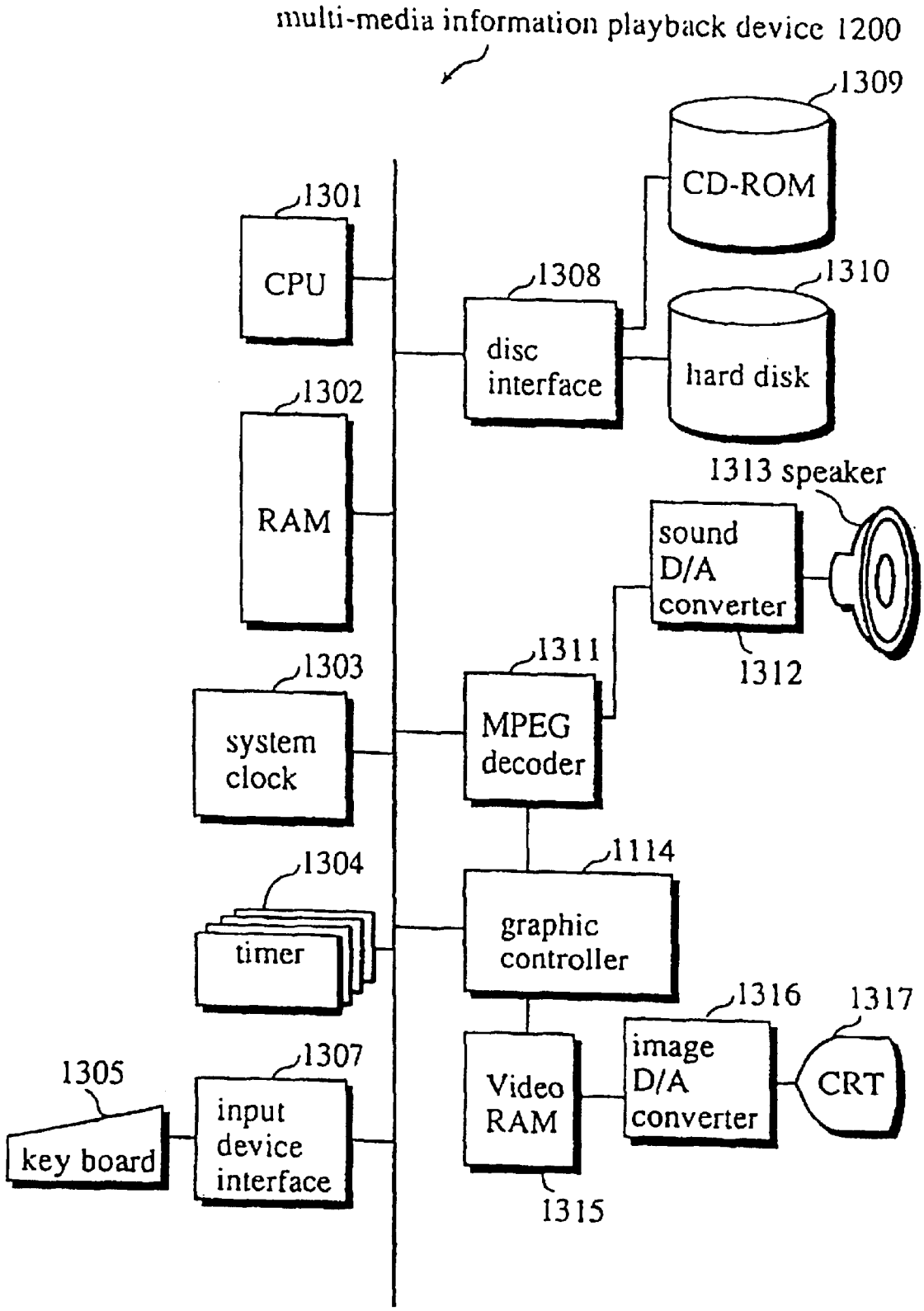
FIG. 13 is a block diagram showing hardware construction of the multimedia information 1200 shown in FIG. 12.

FIG. 12 is a block diagram of construction of a multi-media information record device 1200 of the second embodiment of the present invention. FIG. 13 is a block diagram of the hardware construction of the multi-media information record device 1200 shown in FIG. 12.

As shown in FIG. 12, the multi-media information record device 1200 comprises an input unit 1201, a stream creation unit 1202, a second storage unit 1203, a CD-ROM write unit 1209 and a CD-ROM 1210. The second storage unit 1203 comprises a partial image storage unit 1204, a dynamic picture storage unit 1205, an audio storage unit 1206, a page stream storage unit 1207 and a time line stream storage unit 1208.

As shown in FIG. 13, elements of the hardware construction of the multi-media information record device 1200 is almost the same as the multi-media information playback device 200 shown in FIG. 3, except that the multi-media information record device 1200 does not comprise the joy pad 306 but comprises a hard disc 1310.

The input unit 1201 is implemented by a key board 1305 and an input device interface 1307. The input unit 1201 comprises a scanner and a video capture board, both of which are not illustrated. The scanner inputs printed still pictures as digitalized still picture data. The video capture board inputs motion pictures from a connected video tape recorder as digitalized dynamic picture data.

The stream creation unit 1202 is implemented by a CPU 1301. According to the processing procedure, this unit 1202 instructs a CRT 1317 to display a menu screen and an input request, and receives input of instruction and character information from an editor of multi-media information. According to the instruction, the stream creation unit 1202 reads a partial image file, a dynamic picture file and audio file corresponding to each instruction, from the partial image storage unit 1204, the dynamic picture storage unit 1205, and the audio storage unit 1206, respectively, and interactively creates the page stream and the time line stream shown in FIGS. 5 and 6. Input of the control information is carried out by a character input from the input unit 1201. The processing of the stream creation unit 1202 is explained later, by means of flow charts in FIGS. 14 and 15.

The second storage unit 1203 is implemented by a hard disc 1310. This unit comprises the partial image storage unit 1204, the motion picture storage unit 1205, the audio storage unit 1206, the page stream storage unit 1207, and the time line stream storage unit 1208.

The partial image storage unit 1204 stores one or a plurality of partial image file(s). One partial image is already cut out from material data for expressing a still picture. The partial image is shown by bit map data or graphic data which are compressed and encoded according to MPEG, and stored in each partial image file. Contents in each partial image file correspond to the partial image data of the page stream. When the material data is correlated with control information or other material data by editing, it constitutes multi-media information.

The dynamic picture storage unit 1205 stores one or a plurality of dynamic picture file(s). In the dynamic picture file, still picture data cut out from the material data of still pictures for expressing dynamic pictures are stored in order of the display time, corresponding to a predetermined display time.

The audio storage unit 1206 stores one or a plurality of audio file(s). Audio data divided into the amount of sound data, which corresponds to the length of time in which one still picture data is displayed, are stored in order of the display time.

The page stream storage unit 1207 stores the page stream created by the stream creation unit 1202.

The time line stream storage unit 1208 stores the time line stream created by the stream creation unit 1202.

The CD-ROM write unit 1209 is implemented by a disc interface 1308. According to the instruction of the input unit 1201, this unit 1209 reads the page stream and the time line stream from the page stream storage unit 1207 and the time line stream storage unit 1208, respectively, and stores them in the CD-ROM 1110.

Figure 15:
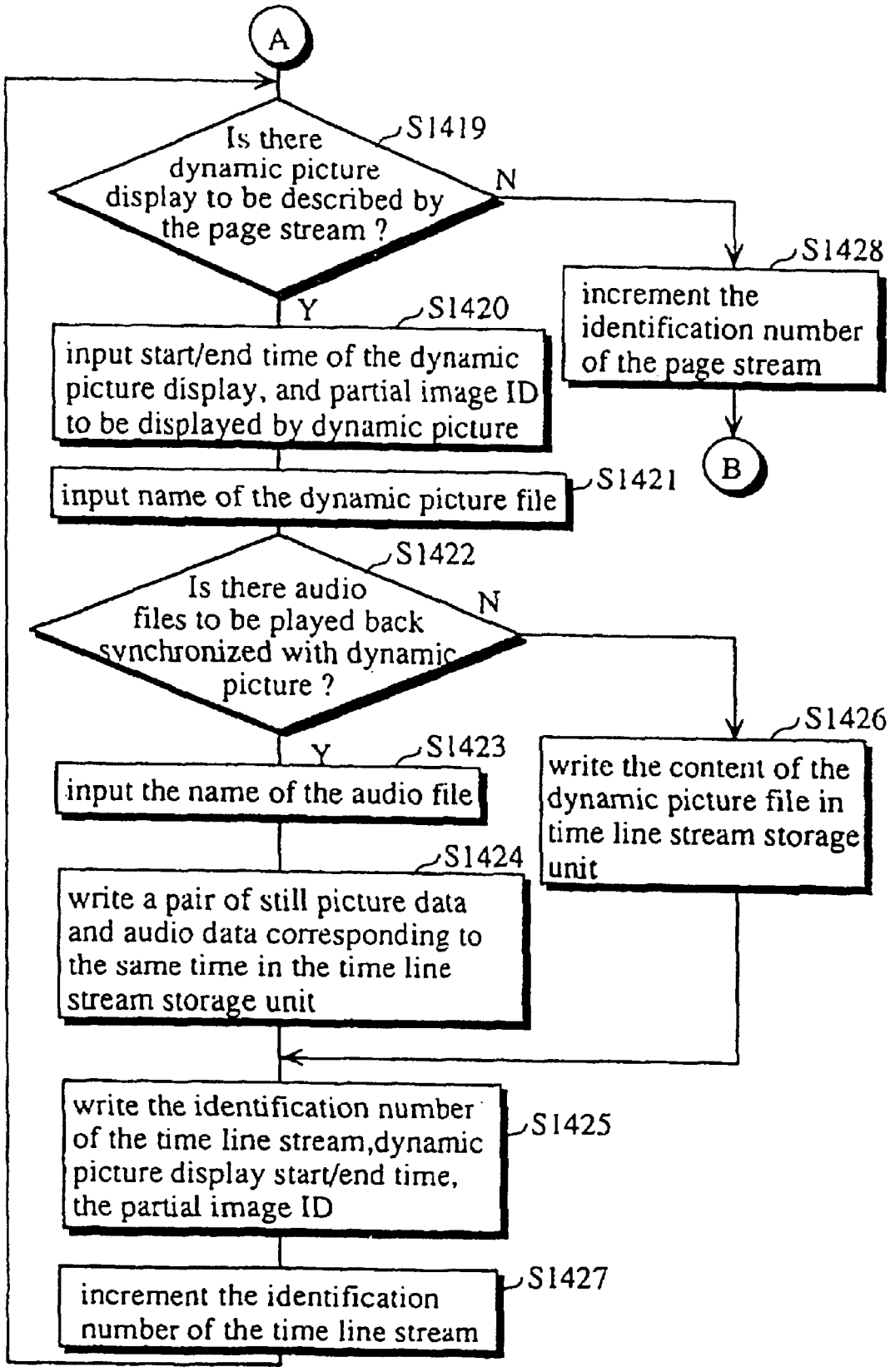
FIG. 15 is a flow chart showing procedure of the recording processing of the multi-media information in the multi-media information record device 1200 of the present embodiment.

FIGS. 14 and 15 show flow charts showing procedure of storing multi-media information in the multi-media information record device 1200 of the present invention. Steps 1419–1428 are shown in a flow chart in FIG. 15.

The stream creation unit 1202 initializes the identification number of the page stream and the time line steam to "1". (Step 1401)

The stream creation unit 1202 requests an input instructing whether contents to be described exist in the page stream. When the contents to be described exist in the page stream (Step 1402), the stream creation unit 1202 initializes the partial image ID "1" (Step 1403).

The stream creation unit 1202 further requests input instructing whether contents to be described as a partial image of the partial image ID exist. When the content exist (Step 1404), the stream creation unit 1202 receives a name of the partial image file which shows the partial images (Step 1405). Also, the stream creation unit 1202 receives input of X-Y coordinates, X-Y enlargement rates and a rotational angle, each of which describing the display position, enlargement rate and rotational angle of the partial image on the initial screen of the page stream (Step 1406). The stream creation unit 1202 writes the partial image ID, X-Y coordinates, X-Y enlargement rates and the rotational angle in the storage areas allocated to each item of the partial image ID of the page stream in the page stream storage unit 1207. Then the stream creation unit 1202 reads the partial image file, whose name is inputted, from the partial image storage unit 1204, and writes the contents of the file in the storage areas allocated to each item of the partial image data having the partial image ID of the page stream in the page stream storage unit 1207 (Step 1407). Then, the stream creation unit 1202 increments the partial image ID (Step 1408), and goes back to Step 1404.

In Step 1404, when the contents to be described as the partial image of the partial image ID does not exist, the stream creation unit 1202 further requests input instructing whether the page stream has control information to be described. When the page stream has the control information (Step 1409), the stream creation unit 1202 receives input of a name of the input signal (Step 1410), and receives input of commands to be executed according to the name of the input signal (Step 1411). The stream creation unit 1202 writes the name of the inputted input signal and the command in non working area of the storage area allocated to the items of the control information of the page stream in the page stream storage unit 1207 (Step 1412), and then goes back to Step 1409.

In Step 1409, when the contents to be described as the partial image of the control information do not exist, the stream creation unit 1202 further requests input instructing whether the page stream has animation display to be described. When the animation display exists (Step 1413), the stream creation unit 1202 receives input of the partial image ID of the partial image to be displayed in animation (Step 1414), and receives input of one or a plurality of types of animation instructing how the partial image of the partial image ID should be displayed in animation (Step 1415). The types of animation is chosen from "movement", "enlarge", "rotation", and the like. A parameter, which changes with the passage of time is designated according to the input of the type of animation. The stream creation unit 1202 requests input instructing whether a pair of a time and a value, both of which should be shown by the page stream, exists; the time being expressed by the elapsed time from the start of the execution of the time line information and the value corresponding to the type of inputted animation, and the time mentioned above. When the pair exists (Step 1416), the stream creation unit 1202 receives the input (Step 1417). Specifically, as parameters corresponding to the time mentioned above, values of the X-Y coordinates, the X-Y enlargement rates, and the rotational angle are inputted for "movement", "enlargement", and "rotation", respectively.

In Step 1416, when the pair does not exist, the stream creation 1202 writes the partial image ID of the partial image to be displayed in animation and the pair of the time and the parameter in the non working are as of the storage areas allocated to the information relating to the animation display of the page stream in the page stream storage unit 1207 (Step 1418), and goes back to Step 1413.

In Step 1413, when the animation display to be described does not exist in the page stream, the stream creation unit 1202 requests input instructing whether dynamic picture display to be described exists in the page stream. When the dynamic picture display to be described exists (Step 1419), the stream creation unit 1202 receives input of a start and end times of the dynamic picture display, and the partial image ID of the partial image which should be displayed in dynamic picture (dynamic picture display object) (Step 1420).

The stream creation unit 1202 further receives input of the name of the dynamic picture file which shows the dynamic picture to be displayed inside the partial image shown by the inputted partial image ID (Step 1421).

Next, the stream creation unit 1202 requests input instructing whether there is an audio file which shows sound to be played back synchronized with the dynamic picture shown by the name of the inputted file. When the audio file exists (Step 1422), the stream creation unit 1202 receives input of the name of the audio file (Step 1423). Next, the stream creation unit 1202 reads the dynamic picture file and audio file from the dynamic picture storage unit 1205 and the audio storage unit 1206, respectively, and writes the still picture data and a pair of still picture data and audio data of the same time in the storage areas allocated to the time line stream having the identification number in the time line stream storage unit 1208 (Step 1424).

The stream creation unit 1202 writes the start and end times of the inputted dynamic picture display, and the partial image ID of the dynamic picture display object, along with the identification number of the time line stream, in the non working areas allocated to the information relating to the dynamic picture display of the page stream in the page stream storage unit 1207 (Step 1425).

In Step 1422, when the audio file does not exist, the stream creation unit 1202 reads the dynamic picture file whose name is inputted from the dynamic storage unit 1205, and writes the contents of the file in the storage areas allocated to the time line stream having the identification number in the time line stream storage unit 1208 (Step 1426), and then starts Step 1425.

Next, the stream creation unit 1202 increments the identification number of the time line stream (Step 1427), and goes back to Step 1419.

In Step 1419, when the dynamic picture display to be described does not exit in the page stream, the stream creation unit 1202 increments the identification number of the page stream (Step 1428), and goes back to Step 1402.

In Step 1402, when the contents to be described do not exist in the page stream, the stream creation 1202 requests the input instructing order of recording the page stream and the time line stream successively onto the storage areas of the track of the CD-ROM 1210 (Step 1429). The stream creation unit 1202 posts the recording order to the CD-ROM write unit 1209. The CD-ROM write unit 1209 reads the page stream and the time line stream from the page stream storage unit 1207 the time line stream storage unit 1208, respectively, and stores them in the CD-ROM 1210 (Step 1430).

As mentioned above, one or a plurality of partial images can be shown by one page stream, and multi-media can be recorded in the CD-ROM 1210; the multi-media information in which parameters for moving, enlarging/reducing, rotating partial images, commands to be executed according to the input signal, and the time line information are described by the page stream. Also, each page stream and time line stream can be stored successively in the storage areas on the same track of the CD-ROM 1210. According to the present embodiment, the multi-media information stored in the multi-media information record device 1200 can be played back from the CD-ROM 1210 effectively by the multi-media information playback device 200.

According to the present embodiment, the still picture data and the audio data shown by the time line stream are compressed and encoded according to the MPEG, and they are extended and coded by the MPEG decoder 311. But, the still picture data, the audio data, and the partial image data can be compressed and encoded by other formats like VFW (Video for Windows) or QT (Quick Time). And the MPEG decoder 311 can be substituted for a decoder following other formats. When the multi-media information record device 1200 only deals with data which is not compressed and encoded, there is no problem without a decoder.

(Embodiment 3)

Figure 16:
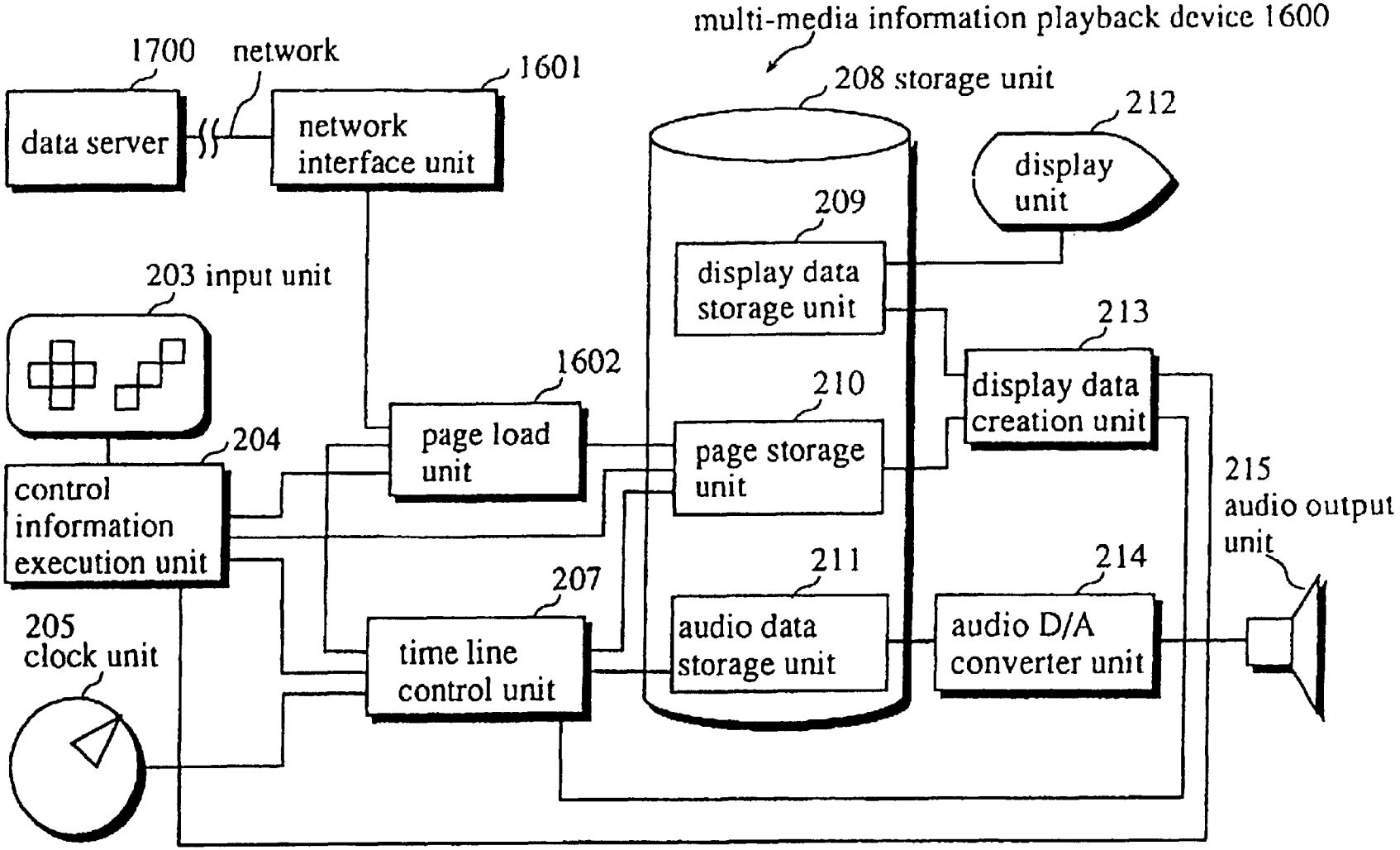
FIG. 16 is a block diagram showing construction of the multi-media information playback device 1600 of the third embodiment of the present invention.
Figure 17:
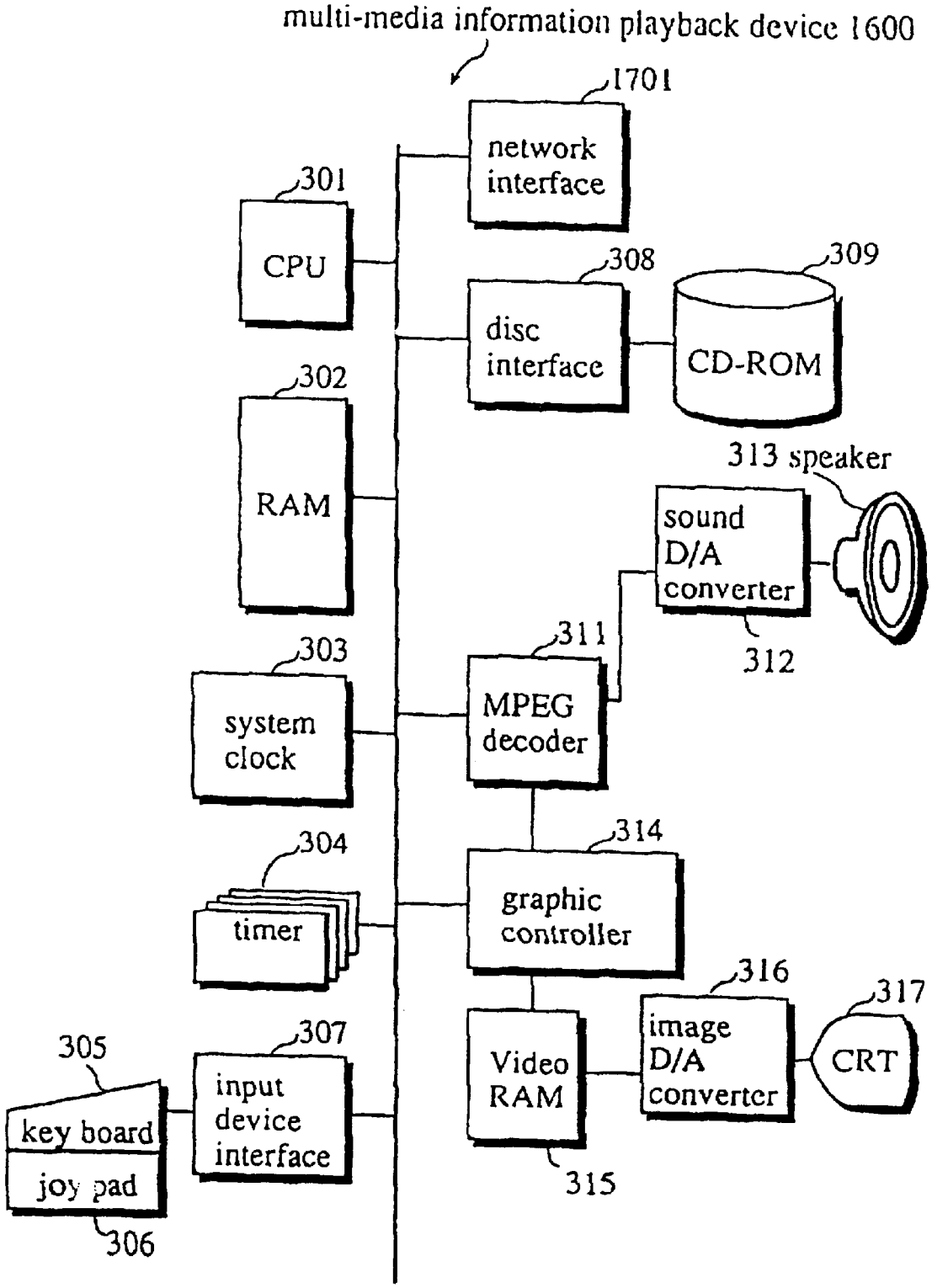
FIG. 17 is a block diagram showing hardware construction of the multimedia information 1600 shown in FIG. 16.

FIG. 16 is a block diagram showing construction of the multi-media information playback device 1600 of the third embodiment of the present invention. FIG. 17 is a block diagram showing hardware construction of the multi-media information playback device shown in FIG. 16.

As shown in FIG. 16, the multi-media information playback device 1600 is connected to a data server 1700 through a network, comprising a network interface unit 1601 and a page load unit 1602. Other elements are the same as the multi-media information playback device 200 shown in FIG. 2, so only the same reference numbers are given without explanation. The multi-media information can be equipped with the CD-ROM 201 and the CD-ROM interface unit 202.

As shown in FIG. 17, the hardware construction of the multi-media information playback device 1600 is the same as that of the multi-media information playback device 200 shown in FIG. 3 except that it comprises a network interface 1701. Explanation of the hardware construction is omitted, since it is the same as that of the multi-media information playback device 200, so only the same reference numbers are given.

The data server 1700 is an external device comprising storage devices like a hardware disc device, which is not illustrated. The data server 1700 stores the page stream shown in FIG. 5 and the time line stream shown in FIG. 6 in the storage device, one page stream being stored as one file and one time line stream as one file. The data server 1700 reads files which contains the corresponding page stream and time line stream from the hard disc device according to the read request from the multi-media information playback device 1600 via the network, and transfers the page stream and the time line stream to the multi-media information playback device 1600.

The network interface unit 1601 is implemented by a network interface 1701. According to the instruction of the page load unit 1602, this unit 1601 reads multi-media information described by the page stream and the time line stream stored in the data server 1700. Specifically, the network interface unit 1601 transmits PT partition showing whether the read request information is the page stream ("P") or the time line stream ("T") as for the page stream or the time line stream designated by the page load unit 1602, along with the identification number and the read request, to the data server 1700 via the network. The network interface unit 1601 receives the page stream or the time line stream transmitted from the data server 1700 according to the read request via the network.

The page load unit 1602 is implemented by the CPU 301. Processing of the page load unit 1602 is the same as that of the page load unit 206 of the first embodiment except that the read request of the page stream and the time line stream are given to the network interface unit 1601 instead of the CD-ROM interface unit 202.

Explanation about the procedure of the playback of the multi-media information playback device 1600 follows next, only focusing the difference between the multi-media information playback devices 1600 and 200.

In step 701, when the multi-media information playback device 1600 is activated, the page load unit 1602 instructs the network interface unit 1601 to read a predetermined page stream, e.g. the page stream 1 shown in FIG. 8, from the data server 1700. The network interface unit 1601 transfers a PT partition "P", an identification number "1" and its read request to the data server 1700, and receives the page stream "1" from the data server 1700. The page load unit 1602 loads the page stream to the page storage device 210.

The following explanation is about Steps 705–707 when the page stream 1 is loaded.

When the identified input unit is B, the control information execution unit 204 executes a command "Start the clock of the time line," which corresponds to the input signal B. Specifically, the control information execution unit 204 instructs the time line control unit 207 to start the execution of the time line information described by the page stream 1. Next, the time line control unit 207 activates the clock 205 and reads the time line information in the page steam 1. When the designated time line stream exits in the time line information which describes the dynamic picture display, the time line control unit 207 instructs the page load unit 1602 to load the time line stream. In the page stream 1 shown in FIG. 8, an identification number of the time line stream to be displayed in dynamic picture "1" is designated, so the time line control unit 207 instructs the page load unit 1602 to load the time line stream 1 to the page storage unit 210. The page load unit 1602 instructs the network interface unit 1601 to read the time line stream 1, and the network interface unit 1601 transfers a PT partition "T", an identification number "1" and its read request to the data server 1700. The time line stream 1 from the data server 1700 is loaded to the page storage unit 210. The processing afterwards is the same as that of Embodiment 1.

When the identified input signal is C, the control information execution unit 204 executes a command "Read the page stream 2," which corresponds to the input signal C. Specifically, the control information execution unit 204 instructs the page load unit 1602 to load the page stream 2 to the page storage unit 210. The page load unit 1602 instructs the network interface unit 1601 to read the page stream 2. The network interface unit 1601 transfers a PT partition "P", an identification number "2" and its read request to the data server 1700. The page load unit 1602 loads the page stream 2, which is transferred to the network interface unit 1601 from the data server 1700, to the page storage unit 210. The processing afterwards is the same as that of Embodiment 1.

As mentioned above, the multi-media information playback device 1600 produces the same effect as that of the multi-media information playback device 200 of Embodiment 1 by the page stream and the time line stream from the data server 1700, according to the present embodiment.

The data server 1700 does not necessarily have to store the page stream and the time line stream, separately. The data server 1700 can store them by the identification numbers of each file expressed by ordering numbers and the like. In this case, designation of the page stream and the time line stream described by the page stream information and the time line stream information, and the designation of the page stream and the time line stream by the parameters of the control information execution unit 204 and the time line control unit 207 are carried out by the identification numbers of each file.

In the present invention, the contents of the time line stream do not necessarily have to be loaded to the page storage unit 210 at a time. For example, the page load unit 206 can load the designated still picture data and the audio data in the designated time line stream to the page storage unit 210 at every display time of the dynamic picture display: the display data creation unit 213 can read the loaded still picture data from the page storage unit 210 and create display data; the time line control unit 207 can transfer the loaded audio data to the audio data storage unit 211. The following processing should be carried out in order to realize the variations mentioned above. The network interface unit 1601 and the data server 1700 reserve the communication areas of the network for a given time corresponding to the dynamic picture display execution time. Then the data server 1700 reads the still picture data and the audio data when they are compressed and encoded according to the MPEG and the like from the file which records time line stream of the read request. The page load unit 1602 loads the still picture image data and the audio data to the page storage unit 210 in the multi-media information playback device 1600 which receives the still picture data and the audio data corresponding to each display time via the network. The loaded still picture data and the audio data are played back at the proper display time by each of the elements of the multi-media information playback device 1600. In the data server 1700, one time line stream is stored in one file. So when the still picture data and the audio data in the same time line stream are read, read request to the data server 1700 does not happen. So, according to the present invention, even though the contents of the time line stream is not loaded to the page storage unit 210 at a time, the still picture data and audio data corresponding to the display time from the same time line stream are read at high speed. So breaks does not happen in the sound and dynamic pictures.

When the dynamic picture display, the time line control unit 207 can directly instruct the network interface unit 1601 to read the designated time line stream.

(Embodiment 4)

Figure 18:
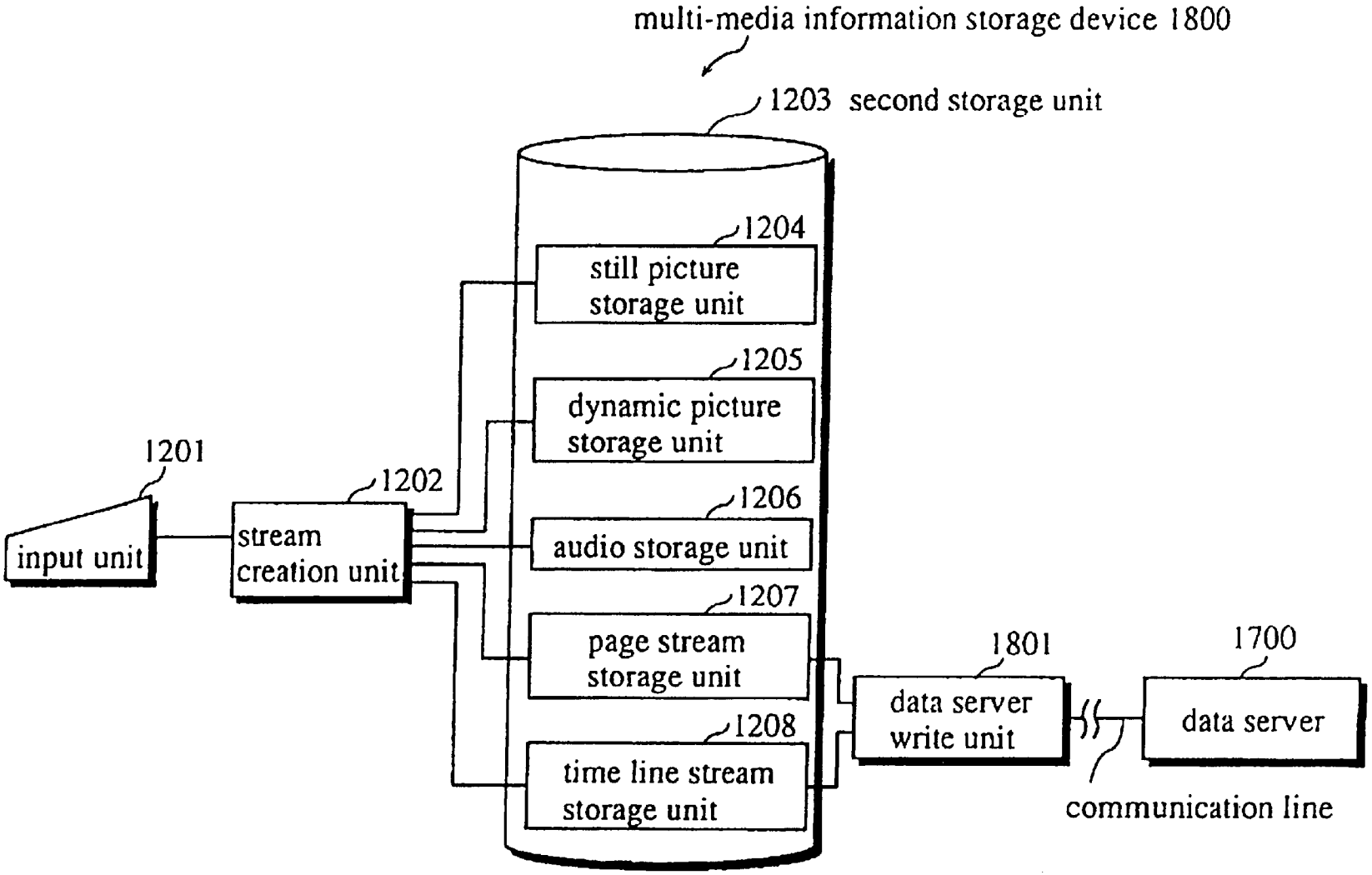
FIG. 18 is a block diagram showing construction of the multi-media information record device 1800 of the fourth embodiment of the present invention.
Figure 19:
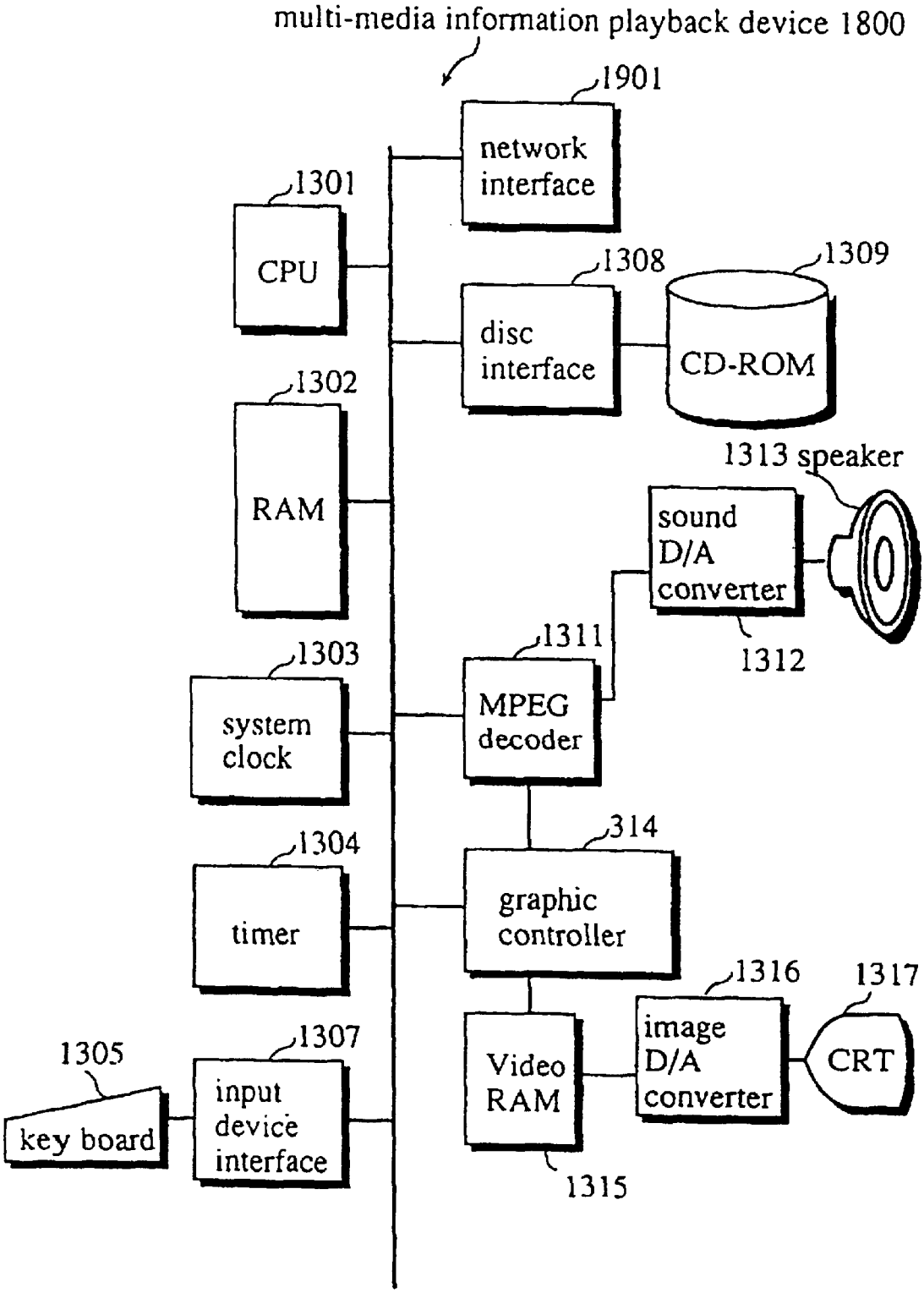
FIG. 19 is a block diagram showing hardware construction of the multimedia information 1800 shown in FIG. 18.

FIG. 18 is a block diagram showing the construction of the multi-media information record device 1800 of the fourth embodiment of the present embodiment. FIG. 19 is a block diagram showing hardware construction of the multi-media information record device 1800 shown in FIG. 18.

As shown in FIG. 18, the multi-media information record device 1800 is connected to the data server 1700, instead of the CD-ROM write unit 1209 and the CD-ROM 1210 of the multi-media information record device 1200 shown in FIG. 12, via a communication line, and comprises a data server write unit 1801. Other elements are the same as the multi-media information record device 1200, so explanation is omitted. Only reference numbers are given.

As shown in FIG. 19, the hardware construction of the multi-media information record device 1800 comprises a net interface 1901, instead of the CD-ROM 1309 of the multi-media information record device 1200 shown in FIG. 13. Other elements are the same as the multi-media information record device 1200 shown in FIG. 13. So explanation is omitted. Only reference numbers are given.

The data server 1700 receives the page stream and the time line stream transferred from the data server write unit 1801 along with a write request via a communication line, and stores them in the storage devices inside, e.g. a hard disc device which is not illustrated, as individual file.

The data server write unit 1801 is implemented by the network interface 1901. The processing of the data server write unit 1801 is the same as that of the CD-ROM write unit 1209 shown in FIG. 12, but the created page stream and the time line stream are stored in the storage device inside the data server 1700 which is connected via a communication line, instead of the CD-ROM 1201. The data server write unit 1801 reads the time line stream from the time line stream storage unit 1208 according to the notification from the stream creation unit 1202, and transfers a PT partition "T" of the time line stream, an identification number, and the time line stream to the data server 1700 along with the write request. Then the data server 1700 records the page stream in the file having the PT partition "P" and the identification number, and records the time line stream in the file having the PT partition "T" and the identification number.

According to the present embodiment, the multi-media information record device 1800 can stored the page stream and the time line stream shown in FIG. 5 and FIG. 6 in the storage device inside the data server 1700 as one file. The present embodiment can produce the same effect mentioned in Embodiment 1 by playing back the page stream and the time line stream recorded, by the multi-media information record device 1800, in the multi-media information playback device 1600 connected to the data server 1700 via a network. The data server 1700 can store the page stream and the time line stream by the identification numbers of each file, without distinguishing the page stream and the time line stream. In this case, the designation of the page stream and the time line stream described in the information in the page stream and the time line stream, and the designation of the page stream and the time line stream by the parameters of the control information execution unit 204 and the time line control unit 207, are carried out by the identification numbers of each of the files.

Although the present invention has been fully described by way of examples with reference to the accompanying drawings, it is to be noted that various changes and modifications will be apparent to those skilled in the art. Therefore, unless such changes and modifications depart form the scope of the present invention, they should be construed as being included therein.

What is claimed is:

1. A multi-media information playback device which plays back multi-media information [recorded in a recording medium] comprising:

(a) a [disc] *recording medium* having pieces of page information successively stored in a storage area, each piece of page information being made up of multi-media information that describes contents of a plurality of screen images, the page information including:

(1) a partial image list having a pair of partial image information showing a partial image of a screen image and display state information showing display state of the partial image, and (2) control information which describes a command to be executed according to an input signal, including a display state change command instructing to change the display state of the partial image;

(b) a page information read means for reading a piece of page information from the [disc] *recording medium*;

(c) a display data creation means for creating display data of the screen image by placing the partial image shown by the partial image information on a screen;

(d) a display means for displaying each display data created by the display data creation means;

(e) an input means for receiving an input signal from an operator; and (f) a command execution means for detecting the input signal inputted by the operator, judging whether the input signal corresponds to the command described by the control information in the page information read by the page information read means, and instructing the display data creation means to create new display data by changing the display state of the corresponding partial image according to the display state change command when the input signal corresponds to the display state change command;

wherein the display data creation means creates new display data according to the command execution means.

2. The multi-media information playback device of claim 1, wherein the page information includes:

(a) the partial image list;

(b) the control information including an animation display command instructing to change and display the display state information of the partial image corresponding to elapsed time; and (c) time sequence control information including animation control information which describes values of the display state information of the partial image corresponding to the elapsed time;

wherein the command execution means includes:

(a) a first timer for measuring the elapsed time after start of activation; and (b) an animation display command execution unit for activating the first timer when an input signal corresponding to the animation display command is detected, calculating values of the display state information corresponding to the elapsed time of each of the partial images based on the animation control information at predetermined times, instructing the display data creation means to create new display data by changing the display state of the partial image according to the calculated values of the display state information, and stopping the first timer when execution of the animation display command is completed;

wherein the display data creation means creates new display data according to the animation display command execution unit.

3. The multi-media information playback device of claim 2, wherein the page information includes:

(a) the partial image list having a pair of the partial image information and display state information, the display state information including X-Y coordinates showing a display position of the partial image to be displayed on the screen, X-Y enlargement rates showing a ratio of size of the partial image shown by the partial image information and a partial image to be displayed on the screen, and a rotational angle between the partial image shown by the partial image information and a partial image to be displayed on the screen; and (b) time sequence control information including the animation control information which describes at least one among the values of the X-Y coordinates, the X-Y enlargement rates, and the rotational angle corresponding to the elapsed time;

wherein the animation display command execution unit includes:

(a) an X-Y coordinates calculation unit for calculating the X-Y coordinates corresponding to the elapsed time based on the animation control information at predetermined times;

(b) an X-Y enlargement rate calculation unit for calculating the X-Y enlargement rates corresponding to the elapsed time based on the animation control information at predetermined times; and (c) a rotational angle calculation unit for calculating the rotational angle corresponding to the elapsed time based on the animation control information at predetermined times.

4. The multi-media information playback device of claim 3, wherein there is at least one storage area on the [disc] *recording medium* for [successively] storing page information and at least one storage area for [successively] storing time sequence information, the page information including:

(a) the partial image list, (b) the control information including a time sequence processing start command instructing to start execution of time sequence processing corresponding to the elapsed time, and (c) time sequence control information including time sequence processing control information having a name of time sequence information to be played back according to the time sequence processing start command, IDs showing contents of the time sequence information to be played back at predetermined times, and playback state information describing how the time sequence information should be played back in accordance with display of the partial image shown by the partial image information in the partial image list;

wherein the time sequence information has information, which should be played back according to the elapsed time, stored in order of playback;

wherein the command execution means includes:

(a) a second timer for measuring the elapsed time after the start of activation; and (b) a time sequence processing execution unit for activating the second timer when an input signal corresponding to the time sequence processing start command is detected, designating contents of the time sequence information corresponding to the elapsed time, and stopping the second timer when playback of the time sequence information is completed;

wherein the multi-media information playback device further includes:

(a) a page storage means, which is implemented by RAM, for storing the page information read by the page information read means;

(b) a time sequence information read means for reading the time sequence information designated by the time sequence processing execution unit from the [disk] *recording medium*; and (c) a playback means for playing back the time sequence information read by the time sequence information read means, and instructing the display means to display the time sequence information.

5. The multi-media information playback device of claim 4, wherein the page information includes:

(a) the partial image list, (b) the control information, and (c) time sequence control information including time sequence processing control information having a name of first time sequence information as time sequence information to be played back according to the time sequence processing start command, IDs of sound information to be played back at predetermined times, and playback state information which describes how sound information should be played back in accordance with display of the partial image shown by the partial image information in the partial image list;

wherein the time sequence information includes the first time sequence information comprising sound information corresponding to the ID of sound information, the sound information being divided into equal predetermined sizes and placed in order of playback corresponding to the elapsed time;

wherein the time sequence processing execution unit includes a first time sequence processing execution unit for designating the sound information in the first time sequence information corresponding to the elapsed time at predetermined times, when a name of the first time sequence information is shown by the time sequence processing control information;

wherein the playback means includes a sound playback unit for playing back the sound information.

6. The multi-media information playback device of claim 4, wherein the page information includes:

(a) the partial image list, (b) the control information, and (c) the time sequence control information including a name of a second time sequence information as time sequence information to be played back according to the time sequence processing start command, pairs of IDs of sound information and image information to be played back at predetermined times, and the playback state information which describes at least one of dynamic picture and animation should be displayed in an area relating to the partial image shown by the partial image information;

wherein the time sequence information includes the second time sequence information comprising sound information divided into equal predetermined sizes and image information showing an image of at least one of the dynamic picture and the animation, the sound information and the image information being placed in order of playback corresponding to the elapsed time;

wherein the time sequence processing execution unit includes a second time sequence processing execution unit for designating sound information and image information in the second time sequence information corresponding to the elapsed time at predetermined times when the second time sequence information is shown by the time sequence processing control information, and instructing the display data creation means to create new display data by placing the partial image read by the time sequence information read means in an area shown by the playback state information;

wherein the display data creation means creates new display data according to the second time sequence processing execution unit.

7. A multi-media information record device for recording multi-media information in a [disc] *recording medium*, comprising:

(a) a partial image storage means for storing the partial image information of at least one partial image in one partial image file, the partial image information being a part of the screen image;

(b) a partial image list input means for receiving input of a name of at least one partial image file in the partial image storage means and display state information showing display state of the partial image shown by the partial image information in the partial image file;

(c) a page information storage means for having a plurality of separate small storage areas, each of which is used for storing at least a piece of page information which is made up of multi-media information that describes contents of a plurality of screen images;

(d) a partial image list write means for writing a pair of the partial image information and the display state information in a first small storage area in the page information storage means along with the Ids of the partial image information and the display state information, after reading partial image information from the partial image file whose name is inputted, the display state information being inputted according to the partial image information;

(e) a control information input means for receiving input of control information which includes a name of input signal and display state change command instructing to change display state of the partial image corresponding to the input signal;

(f) a control information write means for writing the inputted control information in a second small storage area in the page information storage means; and (g) a page information record means for [successively] recording information, which is written as a piece of page information in each small storage area in the page information storage means, in a storage area on the [disc] *recording medium*.

8. The multi-media information record device of claim 7, wherein the control information includes animation display command instructing to change and display state information of the partial image corresponding to the elapsed time;

wherein the control information input means further includes an animation display command input unit for receiving input of a pair of an input signal and the animation display command;

wherein the multi-media information record device further includes:

(a) a time sequence control information input means for receiving time sequence control information including animation control information, the animation control information describing how display state of the partial image changes according to the elapsed time; and (b) a time sequence control information write means for writing the inputted time sequence control information in a third small storage area in the page information storage means.

9. The multi-media information record device of claim 8, wherein the partial image list input means further includes a display state information input unit for receiving input of display state information for each piece of partial image information, the display information including X-Y coordinates showing a display position of the partial image to be displayed on the screen, X-Y enlargement rates showing a ratio of size of the partial image shown by the partial image information and a partial image to be displayed on the screen, and a rotational angle between the partial image shown by the partial image information and a partial image to be displayed on the screen;

wherein the time sequence control information input means receives input of animation control information which describes how at least one among the values of the X-Y coordinates, the X-Y enlargement rates, and the rotational angle changes corresponding to the elapsed time.

10. A multi-media information playback device for reading multi-media information from a data server connected via a network and playing back the multi-media information, comprising:

(a) a page information read means for reading a piece of page information, which is made up of multi-media information that describes contents of a plurality of screen images, stored as one file from a data server connected via a network, the page information including:

(1) a partial image list having at least one pair of the partial image information showing a partial image of a screen image and display state information describing display state of the partial image, and (2) control information which describes a command to be executed according to an input signal, including a display state change command instructing to change the display state of the partial image;

(b) a display data creation means for creating display data of the screen image by placing the partial image shown by the partial image information on a screen;

(c) a display means for displaying each display data created by the display data creation means;

(d) an input means for receiving an input signal from an operator; and (e) a command execution means for detecting the input signal inputted by the operator, judging whether the input signal corresponds to the command described by the control information in the page information read by the page information read means, and instructing the display data creation means to create new display data by changing the display state of the corresponding partial image according to the display state change command when the input signal corresponds to the display state change command;

wherein the display data creation means creates new display data according to the command execution means.

11. The multi-media information playback device of claim 10, wherein the page information including:

(a) the partial image list;

(b) the control information including the animation display instructing to change and display state information of the partial image corresponding to the elapsed time; and (c) time sequence control information including animation control information which describes values of display state information of the partial image corresponding to the elapsed time;

wherein the command execution means includes:

(a) a first timer for measuring the elapsed time after start of activation; and (b) an animation display command execution unit for activating the first timer when an input signal corresponding to the animation display command is detected, calculating values of the display state information corresponding to the elapsed time of each of the partial images based on the animation control information at predetermined times, instructing the display data creation means to create new display data by changing the display state of the partial image according to the calculated values of the display state information, and stopping the first timer when execution of the animation display command is completed;

wherein the display data creation means creates new display data according to the animation display command execution unit.

12. The multi-media information playback device of claim 11, wherein the page information including:

(a) the partial image list having of at least one pair of the partial image information and the display state information including X-Y coordinates showing a display position of the partial image to be displayed on the screen, X-Y enlargement rates showing a ratio of size of the partial image shown by the partial image information and the partial image to be displayed on the screen, and a rotational angle between the partial image shown by the partial image information and the partial image to be displayed on the screen;

(b) the control information including the animation display command; and (b) time sequence control information including the animation control information which describes at least one among the values of the X-Y coordinates, the X-Y enlargement rates, and the rotational angle corresponding to the elapsed time;

wherein the animation display command execution unit includes:

(a) an X-Y coordinates calculation unit for calculating the X-Y coordinates corresponding to the elapsed time based on the animation control information at predetermined times;

(b) an X-Y enlargement rate calculation unit for calculating the X-Y enlargement rates corresponding to the elapsed time based on the animation control information at predetermined times; and (c) a rotational angle calculation unit for calculating the rotational angle corresponding to the elapsed time based on the animation control information at predetermined times.

13. The multi-media information playback device of claim 12, wherein the page information including:

(a) the partial image list;

(b) the control information including a time sequence processing start command instructing to start execution of time sequence processing corresponding to the elapsed time; and (c) time sequence control information including time sequence processing control information having a name of time sequence information to be played back according to the time sequence processing start command, Ids showing contents of the time sequence information to be played back at predetermined times, and playback state information describing how the time sequence information should be played back in accordance with display of the partial image shown by the partial image information in the partial image list;

wherein the command execution means includes:

(a) a second timer for measuring the elapsed time after the start of activation; and (b) a time sequence processing execution unit for activating the second timer when an input signal corresponding to the time sequence processing start command is detected, designating contents of the time sequence information corresponding to the elapsed time, and stopping the second timer when playback of the time sequence information is completed;

wherein the multi-media information playback device further includes:

(a) a page storage means, which is implemented by RAM, for storing the page information read by the page information read means;

(b) a time sequence information read means for reading contents of the time sequence information designated by the time sequence processing execution unit from the time sequence information stored as one file in the data server via a network, the time sequence information having contents in order of playback corresponding to the elapsed time and its name being included in the time sequence control information; and (c) a playback means for playing back the time sequence information ready by the time sequence information read means, and instructing the display means to display the time sequence information.

14. The multi-media information playback device in claim 13, wherein the page information including:

(a) the partial image list;

(b) the control information; and (c) time sequence control information including time sequence processing control information having a name of the first time sequence information as time sequence information to be played back according to the time sequence processing start command, sound information to be played back according to the elapsed time of the first time sequence information, and playback state information describing how the sound information should be played back in accordance with display of the partial image shown by partial image information in the partial image list;

wherein the time sequence processing execution unit includes a first time sequence processing execution unit for designating the sound information in the first time sequence information corresponding to the elapsed time at predetermined times, when a name of the first time sequence information is shown by the time sequence processing control information;

wherein the time sequence information read means reads the sound information designated by first time sequence processing execution unit from the first time sequence information stored as one file in the data server, the first time sequence information describing the divided sound information in order of playback corresponding to the elapsed time and its name being included in the time sequence control information;

wherein the playback means includes a sound playback unit for playing back the sound information.

15. The multi-media information playback device of claim 13, wherein the page information including:

(a) the partial image list;

(b) the control information; and (c) the time sequence control information including a name of the second time sequence information as time sequence information to be played back according to the time sequence processing start command, a pair of sound information and image information to be played back corresponding to the elapsed time of the second time sequence information, and playback state information which describes at least one of dynamic picture and animation should be displayed in the area relating to the partial image shown by the partial image information;

wherein the time sequence processing execution unit includes a second time sequence processing execution unit for designating sound information and image information in the second time sequence information corresponding to the elapsed time at predetermined times when the second time sequence information is shown by the time sequence processing control information, and instructing the display data creation means to create new display data by placing the partial image read by the time sequence information read means in an area shown by the playback state information;

wherein the time sequence information read means reads the sound information and the screen image information designated by the second time sequence processing execution unit from the second time sequence information stored as one file in the data server, the time sequence information describing the divided sound information in order of playback and the screen image information describing one screen image of at least one of motion picture and animation corresponding to the elapsed time and its name being included in the time sequence control information;

wherein the display data creation means creates new display data according to the second time sequence processing execution unit.

16. A multi-media information record device for recording multi-media information in a data server connected via a network, comprising:

(a) a partial image storage means for storing the partial image information of at least one partial image in one partial image file, the partial image information being a part of the screen image;

(b) a partial image list input means for receiving input of a name of at least one partial image file in the partial image storage means and display state information showing display state of the partial image shown by the partial image information in the partial image file;

(c) a page information storage means for having a plurality of separate small storage areas, each of which is used for storing at least a piece of page information which is made up of multi-media information that describes contents of a plurality of screen images;

(d) a partial image list write means for writing a pair of the partial image information and the display state information in a first small storage area in the page information storage means along with the Ids of the partial image information and the display state information, after reading partial image information from the partial image file whose name is inputted, the display state information being inputted according to the partial image information;

(e) a control information input means for receiving input of control information which includes a name of input signal and display state change command instructing to change display state of the partial image corresponding to the input signal;

(f) a control information write means for writing the inputted control information in a second small storage area in the page information storage means; and (g) a page information record means for recording contents of a piece of page information in one file in the data server after transmitting contents written as a piece of page information in each storage area in the page information storage means to a data server along with its write request.

17. The multi-media information record device of claim 16, wherein the control information includes animation display command instructing to change and display state information of the partial image corresponding to the elapsed time;

wherein the control information input means further includes an animation display command input unit for receiving input of a pair of an input signal and the animation display command;

wherein the multi-media information record device further includes:

(a) a time sequence control information input means for receiving time sequence control information including animation control information, the animation control information describing how display state of the partial image changes according to the elapsed time; and (b) a time sequence control information write means for writing the inputted time sequence control information in a third small storage area in the page information storage means.

18. The multi-media information record device of claim 17, wherein the partial image list input means further includes a display state information input unit for receiving input of display state information for each piece of partial image information, the display information including X-Y coordinates showing a display position of the partial image to be displayed on the screen, X-Y enlargement rates showing a ratio of size of the partial image shown by the partial image information and a partial image to be displayed on the screen, and a rotational angle between the partial image shown by the partial image information and a partial image to be displayed on the screen;

wherein the time sequence control information input means receives input of animation control information which describes how at least one among the values of the X-Y coordinates, the X-Y enlargement rates, and the rotational angle changes corresponding to the elapsed time.

19. A multi-media information record device for recording multi-media information in a disc, comprising:

(a) a partial image storage means for storing the partial image information of at least one partial image in one partial image file, the partial image information being a part of the screen image;

(b) a partial image list input means for receiving input of a name of at least one partial image file in the partial image storage means and display state information showing display state of the partial image shown by the partial image information in the partial image file;

wherein the partial image list input means further includes a display state information input unit for receiving input of display state information for each piece of partial image information, the display information including X-Y coordinates showing a display position of the partial image to be displayed on the screen, X-Y enlargement rates showing a ratio of size of the partial image shown by the partial image information and a partial image to be displayed on the screen, and a rotational angle between the partial image shown by the partial image information and a partial image to be displayed on the screen;

(c) a page information storage means for having a plurality of separate small storage areas, each of which is used for storing at least a piece of page information;

(d) a partial image list write means for writing a pair of the partial image information and the display state information in a first small storage area in the page information storage means along with the Ids of the partial image information and the display state information, after reading partial image information from the partial image file whose name is inputted, the display state information being inputted according to the partial image information;

(e) a control information input means for receiving input of control information which includes a name of input signal and display state change command instructing to change display state of the partial image corresponding to the input signal;

wherein the control information includes animation display command instructing to change and display state information of the partial image corresponding to the elapsed time;

wherein the control information input means further includes an animation display command input unit for receiving input of a pair of an input signal and the animation display command;

(f) a control information write means for writing the inputted control information in a second small storage area in the page information storage means;

(g) a page information record means for [successively] recording information, which is written as a piece of page information in each small storage area in the page information storage means, in a storage area on the disc;

(h) a time sequence control information input means for receiving time sequence control information including animation control information, the animation control information describing how display state of the partial image changes according to the elapsed time;

wherein the time sequence control information input means receives input of animation control information which describes how at least one among the values of the X-Y coordinates, the X-Y enlargement rates, and the rotational angle changes corresponding to the elapsed time;

(i) a time sequence control information write means for writing the inputted time sequence control information in a third small storage area in the page information storage means;

(j) a time sequence information storage means having a piece of time sequence information stored in each time sequence information file, the time sequence information having information written in order of playback corresponding to the elapsed time; and (k) a time sequence information record means for [successively] recording time sequence information in a storage area on the disc after receiving input of a name of at least one time sequence information file in the time sequence information storage means, reading time sequence information from the time sequence information file whose name is inputted, and correlating the time sequence information with a name of time sequence information corresponding to the name of the file;

wherein the control information input means further includes a time sequence processing start command input unit for receiving input of a pair of an input signal and a time sequence processing start command in the control information, the time sequence processing start command instructing to start execution of time sequence processing corresponding to the elapsed time and being included in the control information;

wherein the time sequence control information input means further includes a time sequence processing control information input unit for receiving input of the time sequence processing control information which includes a name of time sequence information to be played back according to the time sequence processing start command, Ids showing contents of the time sequence information to be played back at predetermined times, and playback state information which describes how the time sequence information should be played back in accordance with display of the partial image list, the time sequence processing control information being included in the time sequence control information.

20. The multi-media information record device of claim 19, wherein the time sequence information includes first time sequence information in which sound information is divided into predetermined equal data sizes, the sound information being written along with its ID in order of playback corresponding to the elapsed time;

wherein the time sequence information record means includes a first time sequence information record unit for recording first time sequence information in the disc after reading the first time sequence information from the time sequence information file, whose name is inputted, when a name of the first time sequence information is inputted; and wherein the time sequence processing control information input unit includes first time sequence processing control information input unit for receiving input of first time sequence processing control information which includes a name of first time sequence information to be played back according to time sequence processing start command of the page information, Ids of sound information to be played back at predetermined times, and playback state information which describes how the sound information should be played back in accordance with display of the partial image shown by the partial image information in the partial image list, the first time sequence control information being included in the time sequence processing control information.

21. The multi-media information record device of claim 19, wherein the time sequence information record means includes a second time sequence information record unit for recording second time sequence information in the disc after reading the second time sequence information from the time sequence information file, whose name is inputted, when a name of the second time sequence information is inputted, the second time sequence information having sound information divided into predetermined equal data sizes, image information showing one screen image of at least one of animation and dynamic picture and Ids of the sound information and the image information written in order of playback corresponding to the elapsed time; and wherein the time sequence processing control information input unit includes a second time sequence processing control information input unit for receiving input of second time sequence processing control information which includes a name of second time sequence information to be played back according to time sequence processing start command of the page information, pairs of Ids of sound information and image information to be played back at predetermined times, and the playback state information describing at least one of dynamic picture and animation should be displayed in an area relating to partial image shown by the partial image information in the partial image list.

22. A multi-media information record device for recording multi-media information in a data server connected via a network, comprising:

(a) a partial image storage means for storing the partial image information of at least one partial image in one partial image file, the partial image information being a part of the screen image;

(b) a partial image list input means for receiving input of a name of at least one partial image file in the partial image storage means and display state information showing display state of the partial image shown by the partial image information in the partial image file;

(c) a page information storage means for having a plurality of separate small storage areas, each of which is used for storing at least a piece of page information which is made up of multi-media information that describes contents of a plurality of screen images;

(d) a partial image list write means for writing a pair of the partial image information and the display state information in a first small storage area in the page information storage means along with the Ids of the partial image information and the display state information, after reading partial image information from the partial image file whose name is inputted, the display state information being inputted according to the partial image information;

wherein the partial image list input means further includes a display state information input unit for receiving input of display state information for each piece of partial image information, the display information including X-Y coordinates showing a display position of the partial image to be displayed on the screen, X-Y enlargement rates showing a ratio of size of the partial image shown by the partial image information and a partial image to be displayed on the screen, and a rotational angle between the partial image shown by the partial image information and a partial image to be displayed on the screen;

(e) a control information input means for receiving input of control information which includes a name of input signal and display state change command instructing to change display state of the partial image corresponding to the input signal;

wherein the control information includes animation display command instructing to change and display state information of the partial image corresponding to the elapsed time;

wherein the control information input means further includes an animation display command input unit for receiving input of a pair of an input signal and the animation display command;

(f) a control information write means for writing the inputted control information in a second small storage area in the page information storage means;

(g) a page information record means for recording contents of a piece of page information in one file in the data server after transmitting contents written as a piece of page information in each storage area in the page information storage means to a data server along with its write request;

(h) a time sequence control information input means for receiving time sequence control information including animation control information, the animation control information describing how display state of the partial image changes according to the elapsed time;

wherein the time sequence control information input means receives input of animation control information which describes how at least one among the values of the X-Y coordinates, the X-Y enlargement rates, and the rotational angle changes corresponding to the elapsed time;

(i) a time sequence control information write means for writing the inputted time sequence control information in a third small storage area in the page information storage means;

(j) a time sequence information storage means having a piece of time sequence information stored in each time sequence information file, the time sequence information having information written in order of playback corresponding to the elapsed time; and (k) a time sequence information record means for recording contents of time sequence information in one file in the data server for each piece of time sequence information, after receiving a name of at least one time sequence information file in the time sequence information storage means, reading time sequence information from the time sequence information file whose name is inputted, correlating the time sequence information with a name of time sequence information corresponding to the file, and transmitting the time sequence information to the data server along with its write request;

wherein the control information input means further includes a time sequence processing start command input unit for receiving input of a pair of an input signal and a time sequence processing start command in the control information, the time sequence processing start command instructing to start execution of time sequence processing corresponding to the elapsed time and being included in the control information; wherein the time sequence control information input means further includes a time sequence processing control information input unit for receiving input of the time sequence processing control information which includes a name of time sequence information to be played back according to the time sequence processing start command, IDs showing contents of the time sequence information to be played back at predetermined times, and playback state information which describes how the time sequence information should be played back in accordance with display of the partial image shown by the partial image information in the partial image list, the time sequence processing control information being included in the time sequence control information.

23. The multi-media information record device of claim 22, wherein the time sequence information includes first time sequence information in which sound information is divided into predetermined equal data sizes, the sound information being written along with its ID in order of playback corresponding to the elapsed time; wherein the time sequence information record means includes a first time sequence information record unit for recording first time sequence information in the disc after reading the first time sequence information from the time sequence information file, whose name is inputted, when a name of the first time sequence information is inputted; wherein the time sequence processing control information input unit includes first time sequence processing control information input unit for receiving input of first time sequence processing control information which includes a name of first time sequence information to be played back according to time sequence processing start command of the page information, IDs of sound information to be played back at predetermined times, and playback state information which describes how the sound information should be played back in accordance with display of the partial image shown by the partial image information in the partial image list, the first time sequence control information being included in the time sequence processing control information.

24. The multi-media information record device of claim 22, wherein the time sequence information record means includes a second time sequence information record unit for recording second time sequence information in the disc after reading the second time sequence information from the time sequence information file, whose name is inputted, when a name of the second time sequence information is inputted, the second time sequence information having sound information divided into predetermined equal data sizes, image information showing one screen image of at least one of animation and dynamic picture and IDs of the sound information and the image information written in order of playback corresponding to the elapsed time;

wherein the time sequence processing control information input unit includes a second time sequence processing control information input unit for receiving input of second time sequence processing control information which includes a name of second time sequence information to be played back according to time sequence processing start command of the page information, pairs of Ids of sound information and image information to be played back at predetermined times, and the playback state information describing at least one of dynamic picture and animation should be displayed in an area relating to partial image shown by the partial image information in the partial image list.

25. A multi-media information playback device which plays back multi-media information recorded in a recording medium comprising:

(a) a disc having pieces of page information [successively] stored in a storage area, each piece of page information being made up of multi-media information that describes contents of a plurality of screen images, the page information including:

(1) a partial image list having a pair of partial image information showing a partial image of a screen image and display state information showing display state of the partial image, (2) control information which describes a command to be executed according to an input signal, the control information including:

a display state change command instructing to change the display state of the partial image;

an animation display command instructing to change and display the display state information of the partial image corresponding to elapsed time; and a time sequence processing start command instructing to start execution of time sequence processing corresponding to the elapsed time;

(3) time sequence control information having information, which should be played back according to the elapsed time, stored in order of playback, the time sequence control information including:

(a) animation control information which describes values of the display state information of the partial image corresponding to the elapsed time; and (b) time sequence processing control information having a name of time sequence information to be played back according to the time sequence processing start command, IDs showing contents of the time sequence information to be played back at predetermined times, and playback state information describing how the time sequence information should be played back in accordance with display of the partial image shown by the partial image information in the partial image list;

(b) a page information read means for reading a piece of page information from the disc;

(c) a display data creation means for creating display data of the screen image by placing the partial image shown by the partial image information on a screen;

(d) a display means for displaying each display data created by the display data creation means;

(e) an input means for receiving an input signal from an operator; and (f) a command execution means for detecting the input signal inputted by the operator, judging whether the input signal corresponds to the command described by the control information in the page information read by the page information read means, and instructing the display data creation means to create new display data by changing the display state of the corresponding partial image according to the display state change command when the input signal corresponds to the display state change command; the command execution means including:

(1) a first timer for measuring the elapsed time after start of activation;

(2) an animation display command execution unit for activating the first timer when an input signal corresponding to the animation display command is detected, calculating values of the display state information corresponding to the elapsed time of each of the partial images based on the animation control information at predetermined times, instructing the display data creation means to create new display data by changing the display state of the partial image according to the calculated values of the display state information, and stopping the first timer when execution of the animation display command is completed;

(3) a second timer for measuring the elapsed time after the start of activation; and (4) a time sequence processing execution unit for activating the second timer when an input signal corresponding to the time sequence processing start command is detected, designating contents of the time sequence information corresponding to the elapsed time, and stopping the second timer when playback of the time sequence information is completed;

wherein the display data creation means creates new display data according to the animation display command execution unit;

(g) a page storage means, which is implemented by RAM, for storing the page information read by the page information read means;

(h) a time sequence information read means for reading the time sequence information designated by the time sequence processing execution unit from the disk; and (i) a playback means for playing back the time sequence information read by the time sequence information read means, and instructing the display means to display the time sequence information.

26. A multi-media information playback device which plays back multi-media information recorded in a recording medium comprising:

(a) a disc having pieces of page information [successively] stored as one file from a data server connected via a network, each piece of page information being made up of multi-media information that describes contents of a plurality of screen images, the page information including:

(1) a partial image list having a pair of partial image information showing a partial image of a screen image and display state information showing display state of the partial image, (2) control information which describes a command to be executed according to an input signal, the control information including:

a display state change command instructing to change the display state of the partial image;

an animation display command instructing to change and display the display state information of the partial image corresponding to elapsed time; and a time sequence processing start command instructing to start execution of time sequence processing corresponding to the elapsed time;

(3) time sequence control information having information, which should be played back according to the elapsed time, stored in order of playback, the time sequence control information including:

(a) animation control information which describes values of the display state information of the partial image corresponding to the elapsed time; and (b) time sequence processing control information having a name of time sequence information to be played back according to the time sequence processing start command, IDs showing contents of the time sequence information to be played back at predetermined times, and playback state information describing how the time sequence information should be played back in accordance with display of the partial image shown by the partial image information in the partial image list;

(b) a page information read means for reading a piece of page information from the disc;

(c) a display data creation means for creating display data of the screen image by placing the partial image shown by the partial image information on a screen;

(d) a display means for displaying each display data created by the display data creation means;

(e) an input means for receiving an input signal from an operator; and (f) a command execution means for detecting the input signal inputted by the operator, judging whether the input signal corresponds to the command described by the control information in the page information read by the page information read means, and instructing the display data creation means to create new display data by changing the display state of the corresponding partial image according to the display state change command when the input signal corresponds to the display state change command; the command execution means including:

(1) a first timer for measuring the elapsed time after start of activation;

(2) an animation display command execution unit for activating the first timer when an input signal corresponding to the animation display command is detected, calculating values of the display state information corresponding to the elapsed time of each of the partial images based on the animation control information at predetermined times, instructing the display data creation means to create new display data by changing the display state of the partial image according to the calculated values of the display state information, and stopping the first timer when execution of the animation display command is completed;

(3) a second timer for measuring the elapsed time after the start of activation; and (4) a time sequence processing execution unit for activating the second timer when an input signal corresponding to the time sequence processing start command is detected, designating contents of the time sequence information corresponding to the elapsed time, and stopping the second timer when playback of the time sequence information is completed;

wherein the display data creation means creates new display data according to the animation display command execution unit;

(g) a page storage means, which is implemented by RAM, for storing the page information read by the page information read means;

(h) a time sequence information read means for reading the time sequence information designated by the time sequence processing execution unit from the time sequence information stored as one file in the data server via a network, the time sequence information having contents in order of playback corresponding to the elapsed time and its name being included in the time sequence control information; and (i) a playback means for playing back the time sequence information read by the time sequence information read means, and instructing the display means to display the time sequence information.

* * * * *